US008843129B2

(12) United States Patent
Li et al.

(10) Patent No.: US 8,843,129 B2
(45) Date of Patent: Sep. 23, 2014

(54) METHODS AND APPARATUS TO SUPPORT BASE STATION DETECTION AND SELECTION IN MULTI-TIER WIRELESS NETWORKS

(75) Inventors: Ying Li, Garland, TX (US); Zhouyue Pi, Richardson, TX (US); Sudhir Ramakrishna, Plano, TX (US); Baowei Ji, Atlanta, GA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 12/961,334

(22) Filed: Dec. 6, 2010

(65) Prior Publication Data

US 2012/0015649 A1     Jan. 19, 2012

Related U.S. Application Data

(60) Provisional application No. 61/288,734, filed on Dec. 21, 2009, provisional application No. 61/292,121, filed on Jan. 4, 2010, provisional application No. 61/288,686, filed on Dec. 21, 2009.

(51) Int. Cl.
*H04W 24/00* (2009.01)
*H04W 36/00* (2009.01)
*H04W 84/04* (2009.01)

(52) U.S. Cl.
CPC ........ *H04W 36/0061* (2013.01); *H04W 84/045* (2013.01)
USPC .......................................... 455/434; 370/328

(58) Field of Classification Search
CPC ...... H04W 48/18; H04W 60/04; H04W 72/04
USPC ........................ 455/434, 435.2; 370/328, 329
See application file for complete search history.

(56) References Cited

U.S. PATENT DOCUMENTS

| | | | |
|---|---|---|---|
| 2008/0096581 | A1 | 4/2008 | Do et al. |
| 2008/0132239 | A1 | 6/2008 | Khetawat et al. |
| 2009/0247170 | A1 | 10/2009 | Balasubramanian et al. |
| 2009/0288140 | A1 | 11/2009 | Huber et al. |
| 2011/0111757 | A1 * | 5/2011 | Venkatachalam et al. . 455/435.2 |

OTHER PUBLICATIONS

International Search Report dated Aug. 29, 2011 in connection with International Patent Application No. PCT/KR2010/009137.
Written Opinion of the International Searching Authority dated Aug. 29, 2011 in connection with International Patent Application No. PCT/KR2010/009137.

\* cited by examiner

*Primary Examiner* — Phuoc H Doan

(57) ABSTRACT

A subscriber station can efficiently determine an accessible base station by scanning a subset of base stations based on an optimized list received from a serving base station. The subscriber station includes a white list that contains information regarding a number of closed subscriber group (CSG) base stations to which the subscriber station is subscribed. The subscriber station can transmit a request message that includes one or more of: indication of whether the detected identifier of the femto base station is in the whitelist or not; and its location information. In response, the base station can send a message that includes the nearby femtocells and whether the femtocell is accessible or inaccessible to the subscriber station. The femto base station can be designed to be in transmission off mode when none of its subscribers is in its coverage. The serving base station can select a set of the accessible femtocells to the subscriber station, and request the selected femtocells to monitor an uplink signaling of the subscriber station so that the femtocell can be awaken when the femtocell is in transmission off mode or be aware that the subscriber station is in proximity, if the uplink signaling is detected.

34 Claims, 9 Drawing Sheets

METHODS AND APPARATUS TO SUPPORT BASE STATION DETECTION AND SELECTION IN MULTI-TIER WIRELESS NETWORKS

CROSS-REFERENCE TO RELATED APPLICATION(S) AND CLAIM OF PRIORITY

The present application is related to U.S. Provisional Patent Application No. 61/288,734, filed Dec. 21, 2009, entitled "METHODS AND APPARATUS TO SUPPORT BASE STATION DETECTION AND SELECTION IN MULTI-TIER WIRELESS NETWORKS"; U.S. Provisional Patent Application No. 61/292,121, filed Jan. 4, 2010, entitled "METHODS AND APPARATUS TO SUPPORT BASE STATION DETECTION AN DESELECTION IN MULTI-TIER WIRELESS NETWORKS"; and U.S. Provisional Patent Application No. 61/288,686, entitled "METHODS AND APPARATUS TO SUPPORT BASE STATION DETECTION VIA MOBILE STATION RANGING IN MULTI-TIER WIRELESS NETWORKS," filed on Dec. 21, 2009. Provisional Patent Application Nos. 61/288,734, 61/292,121, and 61/288,686 are assigned to the assignee of the present application and are hereby incorporated by reference into the present application as if fully set forth herein. The present application hereby claims priority under 35 U.S.C. §119(e) to U.S. Provisional Patent Application Nos. 61/288,734, 61/292,121 and 61/288,686.

TECHNICAL FIELD OF THE INVENTION

The present application relates generally to wireless communications and, more specifically, to a base station detection in wireless communications systems.

BACKGROUND OF THE INVENTION

The demand of wireless data traffic is explosively increasing. To meet such demand, the cellular systems are evolving into multi-tier networks that include base stations with diverse sizes, types, use cases, and so forth. Momentum is increasing to include more multi-tier base stations, such as femtocells, picocells, relay, and the like, in the wireless communications system. Small-sized low-power base stations, such as picocell, femtocell, and the like, become heated topics, because of their potential advantages of low cost, offloading the traffic from macrocells, providing large amount of wireless data traffic to mobile stations, and the like.

Femtocell devices are small base stations designed for small range use, such as home or small business use. Femtocell devices operate in a small range and are designed to provide cellular coverage in small areas such as the home or office. The typical femtocell device connects to a Security Gateway or Softswitch over an Internet Protocol (IP) connection, such as a Digital Subscriber Line (DSL) or broadband cable connection. The Security Gateway or Softswitch is intended to plug into the DSL or cable modem using a standard Ethernet cable.

Femto Base Stations (FBSs) can be open or closed. An open FBS accepts any compatible mobile device (e.g., accepts communications to and from any compatible cell phone, PDA, and the like). A closed FBS requires that the mobile device be authorized to access through the FBS.

SUMMARY OF THE INVENTION

A subscriber station capable of communicating with a plurality of macro base stations is provided. The subscriber station includes a processor and a memory coupled to the processor. The memory includes a white list. The white list includes information regarding a number of closed subscriber group base stations to which the subscriber station is subscribed. The processor is configured to at least one of: i) scan femto base stations based on a message received from a serving base station, the message configured to identify a subset of femto base stations; and ii) send an uplink signaling to the femto base stations, the uplink signaling sent at a specified resource A macro base station capable of communicating with a plurality of mobile stations is provided. The macro base station includes a receive path configured to receive, from a first mobile station, a first control message that contains at least one CSGID value from a white list of CSGID values associated with at least one closed subscription group to which the first mobile station is subscribed. The macro base stations also includes a controller that is at least one of: i) coupled to a transmit path, the controller configured to, in response to the first control message, transmit, to the first mobile station, a second control message that contains information regarding a subset of femto base stations, the second control message configured to cause the first mobile station to scan femto base stations based on the subset of femto base stations; and ii) coupled to a backhaul network, the controller configured to, select a set of accessible CSG femto base stations that are proximate to the first mobile station, to receive instructions on at least one of waking up and monitoring an uplink signaling.

A femto base station capable of communicating with a plurality of subscriber stations is provided. The femto base station comprises: 1) a receive path configured to receive communications from a first subscriber station; 2) a transmit path configured to transmit communications to the first subscriber station; and 3) a controller coupled to the transmit path and the receive path. The controller is configured to at least one of: i) vary an operating mode of the femto base station based on proximity information for the first subscriber station, wherein, in a first mode the transmit path is disabled; and ii) monitor an uplink signaling from the first subscriber station at a specified resource.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Figure 1:
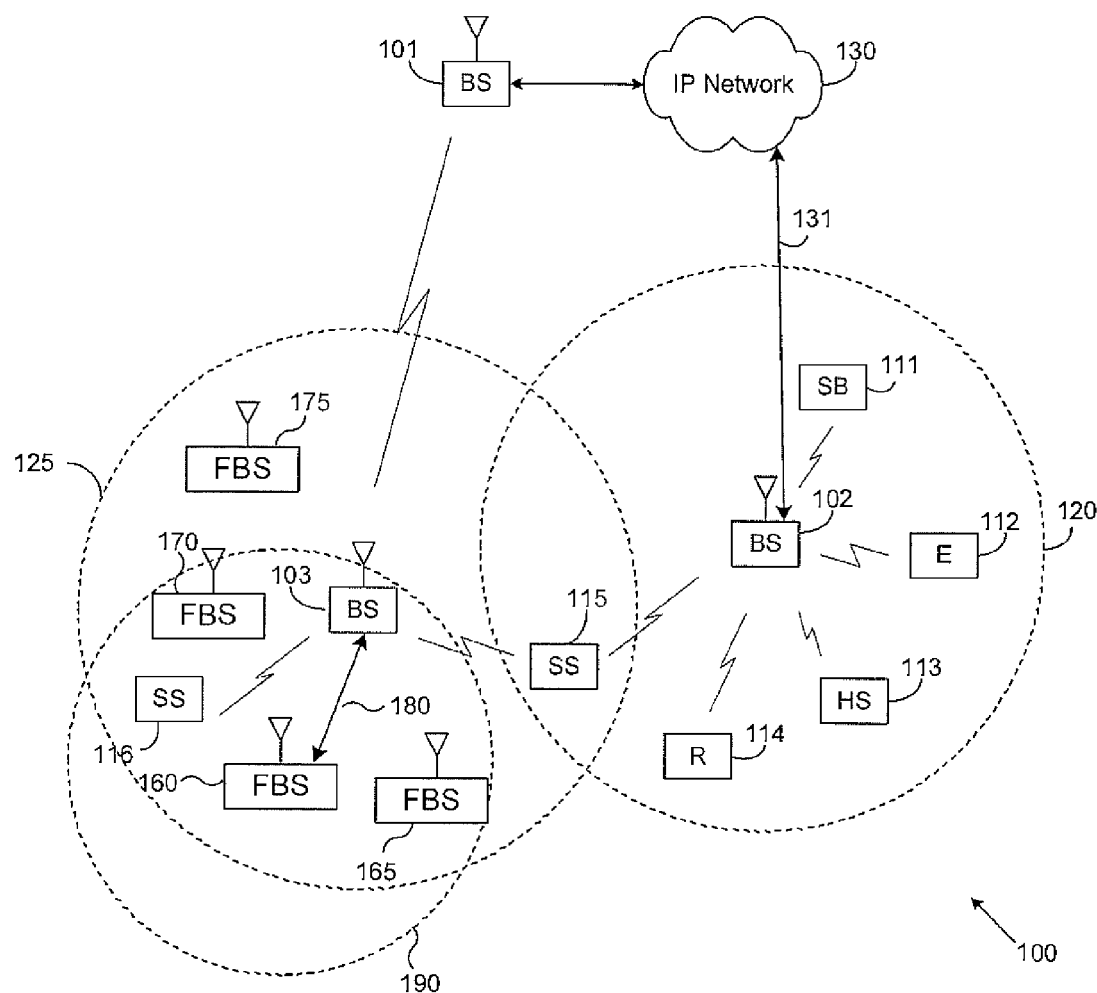
FIG. 1 illustrates an exemplary wireless network, which transmits ACK/NACK messages according to an exemplary embodiment of the disclosure.

FIG. 1 illustrates an exemplary wireless network 100, which transmits ACK/NACK messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via backhaul connection 131) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a wireless fidelity (WiFi) hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via a backhaul connection (not shown) or via base station 101 as a relay) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using orthogonal frequency division multiplexing (OFDM) or orthogonal frequency division multiple access (OFDMA) techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

In some embodiments, the wireless network 100 includes a Femto-cell base station (FBS) 160. FBS 160 includes components analogous to those found in macro base stations BS 101, BS 102 and BS 103. As such, FBS 160 comprises a femto base station controller (FBSC) and one or more femto base transceiver subsystem(s) (FBTS). FBS 160 communicates with mobile stations in its served area using OFDMA, IS-95, CDMA or any other cellular communications standard.

FBS 160, 165, 170 and 175 can communicate with BS 103 via a backhaul connection 180. For example, the backhaul connection 180 may include a connection wherein voice bearer traffic is transferred between the FBS 160 and the IS-41 network (e.g., PSTN) via a communication line and Wireless Gateway (WGW) (not shown). Signaling/control traffic can be transferred between the FBS 160 and the IS-41 network via another communication line and Wireless Soft Switch (WSS) (not shown). The WGW can provide a bearer path between FBS 160 and MSC (not shown) via the IS-41. The WSS can provide a signaling path FBS 160 and WGW as well as to the MSC via the IS-41. In addition, backhaul connection 180 can include, or otherwise be coupled with, backhaul connection 131.

A dotted line shows the approximate boundary of cell 190 in which FBS 160 is located. The cell is shown approximately circular for the purposes of illustration and explanation only. It should be clearly understood that the cell may have an irregular shape, depending on the cell configuration selected and natural and man-made obstructions. Further, although not shown of clarity purpose, FBS 165-175 include corresponding cell boundaries.

Figure 2A:
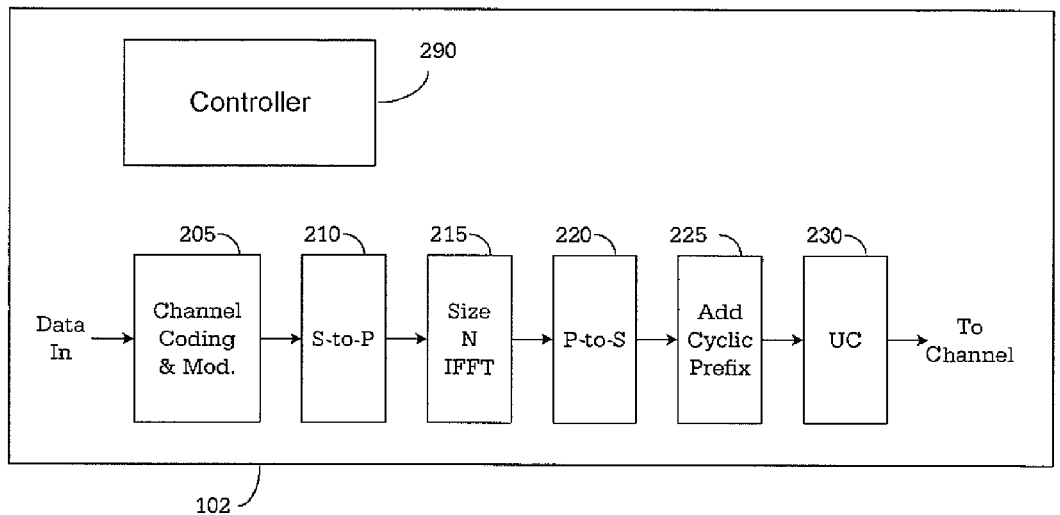
FIG. 2A illustrates a high-level diagram of an orthogonal frequency division multiple access transmit path according to an exemplary embodiment of the disclosure.
Figure 2B:
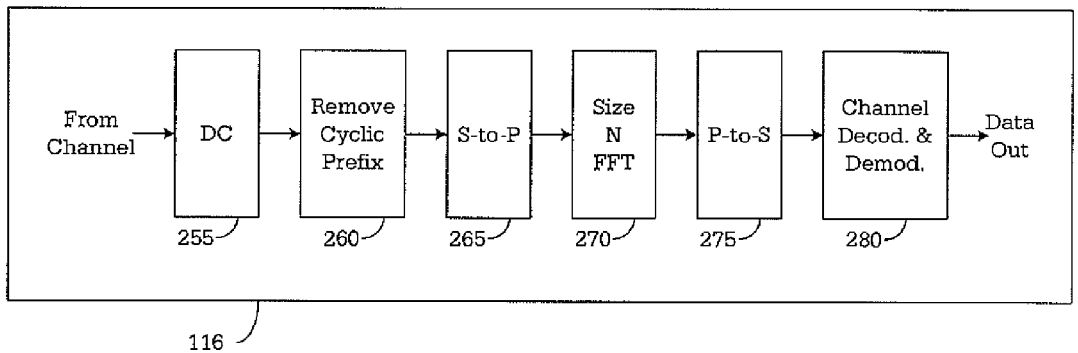
FIG. 2B illustrates a high-level diagram of an orthogonal frequency division multiple access receive path according to an exemplary embodiment of the disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., LDPC coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter (UC) 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter (DC) 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

BS 102 and FBS 160 can each include a base station controller (BSC) 290 coupled to the transmit path and receive path. BSC 290 manages the resources in the cell site, such as cell site 121. BCS 290 also includes a handoff controller. The embodiment of handoff controller included in BCS 290 is for illustration only and the handoff controller and a memory can be located in other portions of BS 102 without departing from the scope of this disclosure.

Each of base stations 101-103 and 160 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

Figure 3:
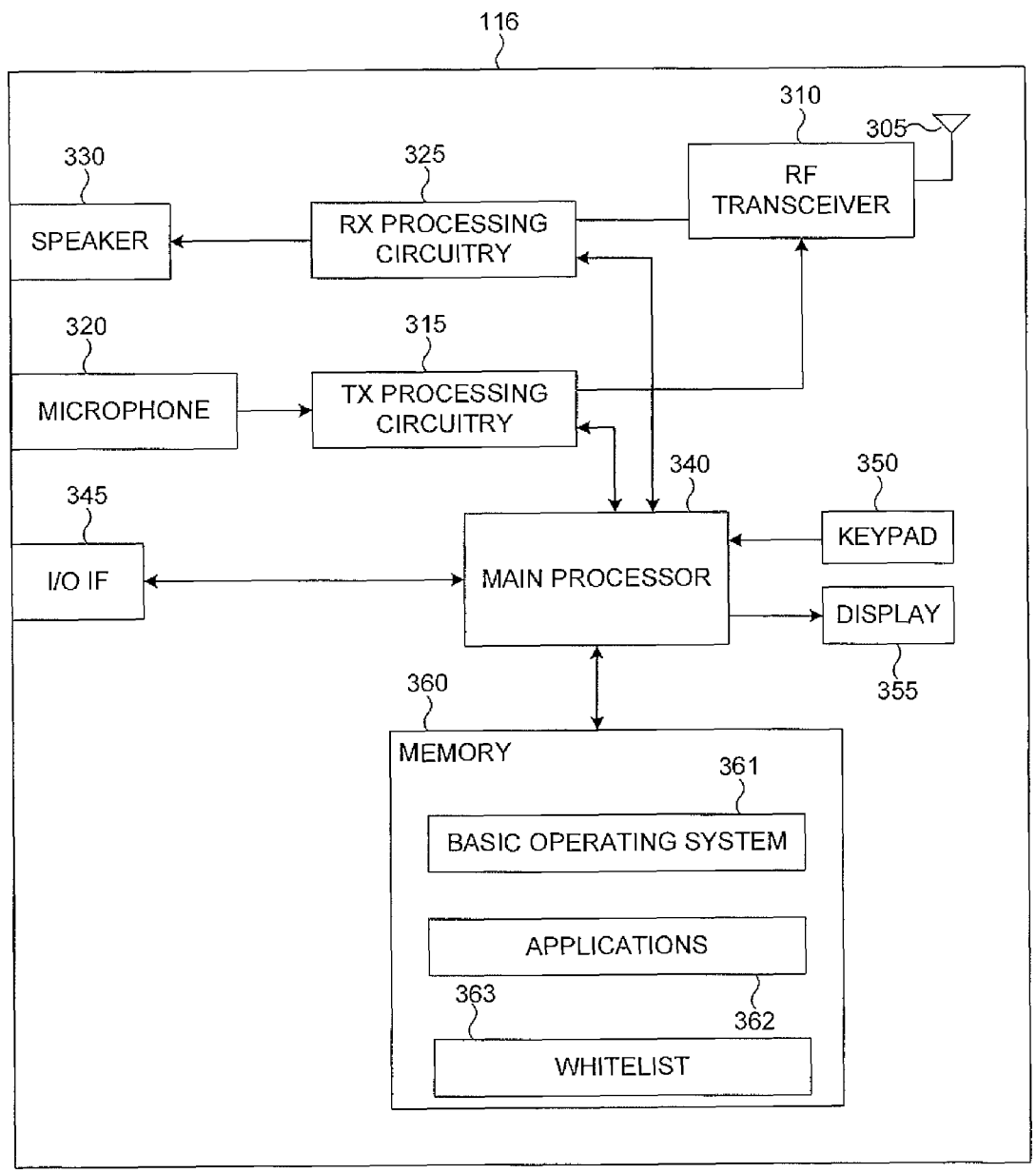
FIG. 3 illustrates an exemplary wireless subscriber station according to embodiments of the present disclosure.

FIG. 3 illustrates an exemplary wireless subscriber station according to embodiments of the present disclosure. The embodiment of wireless subscriber station 116 illustrated in FIG. 3 is for illustration only. Other embodiments of the wireless subscriber station 116 could be used without departing from the scope of this disclosure.

Wireless subscriber station 116 can be an advance subscriber station (AMS). SS 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and a plurality of applications 362 and white list 363. The white list can contain information about the subscribed CSG femto base stations. The information can be a Closed Subscriber Group ID (CSG ID), Frequency Allocation (FA), BS location, BS ID, Cell ID, Nickname, low duty mode pattern, Overlaid macro BSID, and so forth.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In some embodiments of the present disclosure, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for CoMP communications and MU-MIMO communications. Main processor 340 can move data into or out of memory 360, as required by an executing process. In some embodiments, the main processor 340 is configured to execute a plurality of applications 362, such as applications for CoMP communications and MU-MIMO communications. The main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

In the example shown in FIG. 1, the wireless network 100 includes a dense deployment of femtocells. BS 103 is a macro base station. If BS 103 broadcasts to all the femtos, FBS 160-175 under its coverage in its neighbor list, the broadcasting will be overwhelmed since the list could be very long. Given such, BS 103 may not include the femto base stations in its neighbor list broadcasted. This makes it very challenging for SS 116 to detect its subscribed femto base station without the assistant of the neighbor list broadcasted by BS 103. SS 116 then is required to detect its subscribed femto among possibly many surrounding femtos.

In some cases, no femto base stations are disposed within a coverage area of BS 103. For example, when SS 116 enters into a coverage area of BS 103, BS 103 can broadcast a neighbor advertisement message (NBR-ADV) to SS 116. The NBR-ADV message can include a listing of neighboring macro base stations. However, since no femto base stations are disposed within the coverage area 125 of BS 103, the NBR-ADV message contains no information regarding any femto base stations. Therefore, SS 116 may only scan for the neighbor macro base stations listed in the NBR-ADV message to find macro base stations available for handover.

When the coverage area 125 includes femto base stations, SS 116 may expend unnecessary energy searching for an available femto base station. For example, when SS 116 enters into a coverage area of BS 103, BS 103 can send a neighbor message (NBR-ADV) to SS 116. The NBR-ADV message can include a listing of neighboring macro base stations and the femto base stations. Then, SS 116 may scan for available (e.g., subscriber) femto stations, such as by scanning autonomously. SS 116 can utilize information in its white list 363 to determine an available (e.g., subscriber) femto base station. In some cases, the NBR-ADV message does not include CSG femto base stations.

In, IEEE P802.16m/D3, Draft amendment for IEEE 802.16m, December 2009, the contents of which are incorporated by reference in their entirety, an advanced mobile station (AMS) may request additional scanning opportunity by sending advanced air interface (AAI) scanning request message (AAI_SCN-REQ) including the detected secondary advanced preamble (SA-preamble) index and frequency allocation (FA) information. Upon reception of the AAI_SCN-REQ, an advanced base station (ABS) responds with an advanced air interface (AAI) scanning response message (AAI_SCN-RSP) including neighbor accessible Femto ABS list based on the SA-preamble index. When the AMS has to request for information of neighboring Femto ABSs belonging to a closed subscriber group (CSG), then the AMS can provide the desired CSGID(s) in the AAI_SCN-REQ message to the serving ABS. The ABS can respond with a list of ABSs, addressed by BSID belonging to the requested CSGID(s) in AAI_SCN-RSP message. After scanning, the AMS may report preamble indices or BS IDs by sending advanced air interface (AAI) neighbor request message (AAI_NBR-REQ) or scanning report message (AAI_SCN-REP) with neighbor request indication, to which the ABS may unicast a list of femto ABSs which is formed based on the reported preamble index or any other recommended Femto ABSs based on location information.

Some of the approaches in IEEE P802.16m/D3, Draft amendment for IEEE 802.16m, December 2009 are not complete or can be further optimized. For example, in the AAI_SCN-REQ, is there a need for an indicator of whether the request is expecting some optimized list of accessible femto BSs (may include some other BSs not detected, or just ask the serving BS to check whether the reported detected femto cell ID is possibly accessible or not accessible? In addition, in the AAI_SCN-REQ, should there be an indicator of the cell ID being detected, or not detected but in the white list, or so forth? Further, should there be an indicator of the CSGID in the AAI_SCN-REQ be the detected, or not detected but in the white list, or so forth? These questions are not answered by IEEE P802.16m/D3, Draft amendment for IEEE 802.16m, December 2009. With these questions not being answered, IEEE P802.16m/D3, Draft amendment for IEEE 802.16m, December 2009 confuses the operations for base stations and mobile stations.

In another example, in the SCN-REQ/RSP, there is a one bit indicator to indicate whether the scan purpose is for the BS in NBR list, or not; however, such one bit indicator makes SCN-REQ/RSP only be possible to include one purpose in one message, while actually one message may include both scan purposes. The current design in IEEE P802.16m/D3, Draft amendment for IEEE 802.16m, December 2009 does not provide such flexibility.

Along another thread, traditionally, a base station always has transmissions (TX) on, to send its synchronization channel, broadcast channel, etc., so that the mobile station can scan and find the base station. However, for small cells, such as femtocell, when the femtocell owner leaves home for office, the home femtocell may not be used, while everyone leaves the office after work, the office femtocell may not be used while the home femtocell may then be used after the femtocell owner gets back home. Whether it is possible for the femtocell to have some new states, and if yes, how to enable automatic femtocell TX on and off based on whether there are subscribed mobile station nearby, is to be answered.

Embodiments of the present disclosure provide systems and methods to enable the subscriber station to detect its subscribed femto, while enabling the subscriber station to save battery charge by avoiding unnecessary scanning. Some embodiments are provided to enable a femtocell to have new states, such as TX off with RX (receiver) on, when there is no MS who subscribes this femtocell nearby, where some embodiments are to enable the femtocell to enter the new states such as TX off state, and to exit from the new state and going back to the normal state (e.g., waking up femtos in TX off state back to the normal state, and the like).

In the following, although some terms which may be aligned with IEEE 802.16m system are utilized, the ideas and solutions in the disclosure are not limited to an IEEE 802.16m system, and they can be used in any communication systems and networks, with the terms probably being called in different names. In addition, various names for types of femto may be utilized such that the fembtos can be referred to differently in different system. Furthermore, a Femto ABS may belong to one of the following subscription types:

a) CSG-Closed Femto ABS: A CSG-Closed Femto ABS is accessible only to the AMSs, which are in its CSG, except for emergency services. AMSs which are not the members of the CSG, should not try to access CSG-Closed Femto ABSs.

b) CSG-Open Femto ABS: A CSG-Open Femto ABS is primarily accessible to the MS's that belong to its CSG, while other AMS's, outside CSG, may also access such Femto ABS, and will be served at lower priority. CSG-Open Femto ABS will provide service to such AMSs' as long as the QoS of AMSs in its CSG is not compromised.

c) OSG (Open Subscriber Group) Femto ABS: An OSG Femto ABS is accessible to any AMS.

In this disclosure, the Cell ID, or (SA-Preamble, Preamble), can refer to the physical level identifier of the base station, usually conveyed in sync channel. The cell ID could be reused within a type of BS. The frequency allocation (FA) or frequency carrier is the frequency carrier (spectrum) used by a base station. The handover command (HO-CMD), a message used to notify MS how/when to handover (HO). The base station identifier (BSID) can refer to a globally unique identifier of a base station, which is usually carried in broadcast channel of the base station. A super frame header (SFH) can be referred to as broadcast channel (BCH), which contains the most important system information. Throughout the disclosure, the AMS (advanced MS), MS, and SS are interchangeable, ABS (advanced BS), BS, and cell are interchangeable, the message with suffix AAI (advanced air interface) and the message without AAI suffix are interchangeable.

In the examples illustrated herein, macro base stations and femto base stations are utilized for ease of illustration, however, embodiments of the disclosure are not limited to macro base stations or femto base station. For example, embodiments can other base station types and combinations, such as macro base station and pico base station, and so forth.

In some embodiments, a SS 116 performs a search as follows. The SS 116 may go to an FA or carrier frequency, obtain the synchronization channel of the CSG femtocell, such as FBS 160, and obtain and decode the broadcast channel, where SS 116 can get the CSGID of the FBS 160. Then, SS 116 compares the received CSGID with the stored CSGID(s) in the whitelist 363. If the received CSGID is in the whitelist 363, then the detected femtocell is one of the CSG cells to which SS 116 is subscribed. In some embodiments, the CSGID may not be broadcasted by the femtocell or SS 116 may not know what the CSGID of the femtocell is after decoding the broadcast channel. When the MS is trying to perform initial network entry or network re-entry with a femto BS, it may perform ranging and send ranging messages to the femto BS, such as FBS 160. AMS may include CSG ID, BSID, as part of the ranging message to the Femto BS, if one or more CSGID(s) and/or subscribed BSIDs are provisioned in the AMS (e.g., in white list). If some of the CSGID and/or subscribed BSID in the ranging message lie in the set of the CSGID and/or the BSID of the femto BS, then the femto is accessible to the MS and femto BS will follow up with the network entry process. Otherwise, the femto may reject the ranging request.

In order to help SS 116 to attach to nearby femto ABS, such as FBS 160, FBS 160 provides "redirection info" to SS 116 in the ranging response message. An indicator of the 'redirection info' should be included in ranging response message. The indicator of the 'redirection info' being '1' means the ranging response is for redirection, being '0' means normal response.

SS 116 can include information detected or based on white list 363, such as, the FA, preambles, BSID, CSGIDs of the subscribed CSG femto BSs (such as FBS 160), in the ranging request message. Ranging request message can include an indicator of whether the SA-preamble, BSIDs or CSGIDs is detected such as while SS 116 does not support items such as SA-preamble or BSIDs or CSGIDs in the white list 363 or AMS does not have the capability of white list 363 (indicator 00); detected but not in white list 363 (indicator 01); detected and in white list 363 (indicator 10); and not detected but in white list 363 (indicator 11). The ranging request message may include the location information of SS 116 if available (such as the location information based on the GPS, and the like). The cell type such as CSG-open, CSG-closed, open, and so forth could also be indicated in the message for the BSs. All the information can help optimize the list of the redirection info.

For example, in some embodiments, SS 116 provides BS 103 with its location. Then, BS 103 includes a list of acceptable or proximate femto base stations in the NBR-ADV message. Thereafter SS 116 may scan for available (e.g., subscriber) femto stations, such as by scanning autonomously. SS 116 can utilize information in its white list 363 to determine an available (e.g., subscriber) femto base station. If the CSG ID of a femto base station, such as FBS 160, is included in the white list 363, SS 116 knows that it is a subscriber to FBS 160. If the CSG ID of a femto base station, such as FBS 170, is not in the white list, SS 116 knows that it is not subscribed to FBS 170.

In some embodiments, SS 116 can request additional scanning opportunities by sending a scanning request message that includes a detected SA-preamble index and associated FA information. The scanning request message can also include a BSID, a CSGID, or both. The scanning request message can indicate whether it is for the neighbor request or just for an accessibility check for reported ABSs. Upon reception of the scanning request that includes a neighbor request indication, such as set to '1', BS 103 responds with a scanning response that includes a neighbor accessible FBS list based on the SA-preamble index. The neighbor accessible FBS list may include information such as SA-preamble, FA, BSID, CSGID, and so forth. Upon reception of the scanning request with neighbor request indication set to '0', BS 103 responds with a scanning response instructing the accessibility of the ABSs indicated in the received scanning request.

The scanning response can include an indicator of whether an indicated base station is inaccessible or possibly accessible to SS 116. For example, BS 102 may choose to only inform SS 116 regarding inaccessible CSG femto base stations, such as FBS 165-170. Alternatively, BS 102 may choose to inform SS 116 regarding the possibly accessible CSG femto base stations, such as FBS 160 and FBS 175. BS 103 can determine whether to send information regarding inaccessible CSG femto base stations or possibly accessible CSG femto base stations depending upon which method is more efficient. SS 116 can determine the accessible BSs if it receives inaccessible CSG femto BS, or vice versa, by using a complementary operation within all the detected CSG cell ID.

The scanning request message can include an indicator that indicates whether the SA-preamble, BSIDs or CSGIDs is detected. For example, the indicator can be: 1) set to '00' while SS 116 does not support items such as SA-preamble or BSIDs or CSGIDs in the white list or AMS does not have the capability of white list; 2) set to '01' when detected but not in white list; set to '10' when detected and in white list; and set to '11' when not detected but in white list. The scanning request message may include the location information of SS 116 if available (such as the location information based on the GPS, and the like). The cell type such as CSG-open, CSG-closed, open, and so forth, could also be indicated in the message for the BSs. The information can be used to help optimize the list of neighboring BSs.

Figure 4:
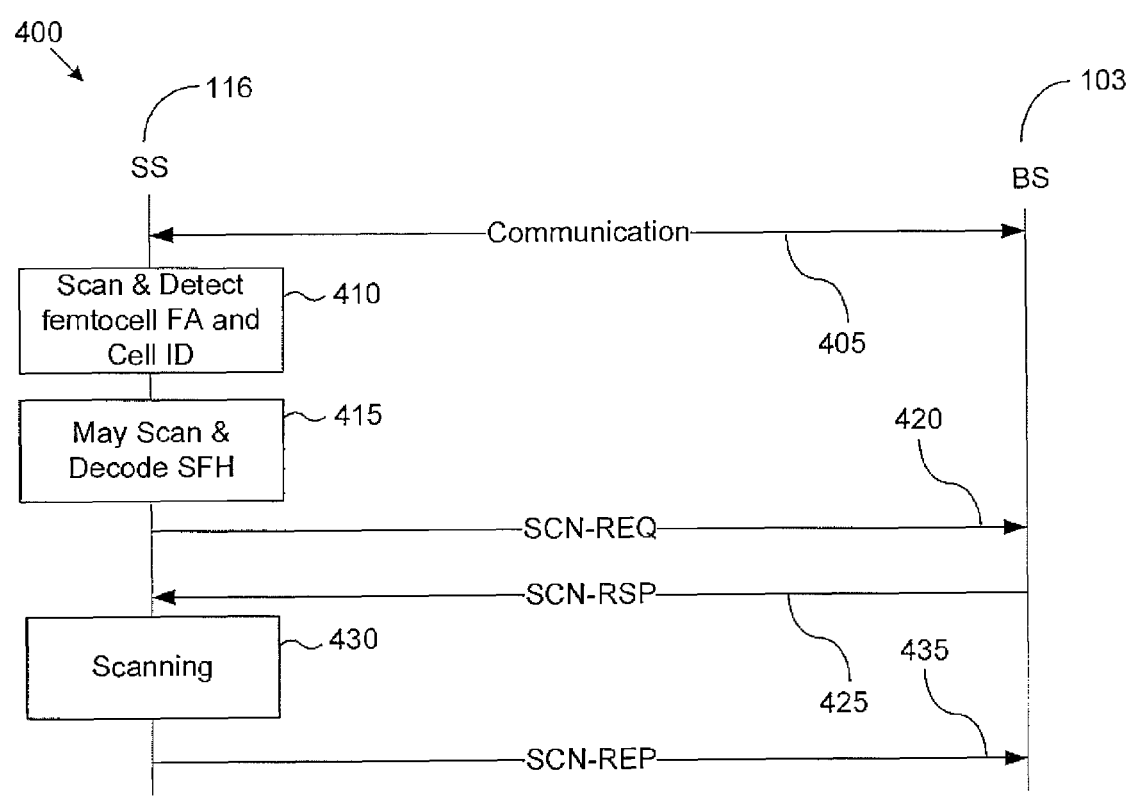
FIG. 4 illustrates an example of the scanning request and response for optimized neighboring femto BSs according to embodiments of the present disclosure.

FIG. 4 illustrates an example of the scanning request and response for optimized neighboring femto BSs according to embodiments of the present disclosure. The embodiment of the scanning request and responses 400 shown in FIG. 4 is for illustration only. Other embodiments could be used without departing from the scope of this disclosure.

When SS 116 enters into a coverage area 125 of BS 103, SS 116 and BS 103 can communicate 405 with each other. In block 410, SS 116 scans and detects Cell IDs and associated FAs of CSG femtos, FBS 160-175. SS 116 may scan and detect Cell IDs and associated FAs of all femto base stations within coverage area 125 or fewer than all the femto base stations within coverage area 125. In block 415, SS 116 may scan and detect some femto super frame headers (SFH). The scan in block 415 may not be limited to CSG femto base stations. SS 116 transmits a SCN-REQ message 420 to BS 103. The SCN-REQ message 420 can include one or more of an indicator of a neighbor request, location information corresponding to SS 116, detected Cell IDs, BS IDs, BSID/CSGID included in the white list 363 and related indicators of detected and not-detected, cell types, and so forth. BS 103 responds with a SCN-RSP message 425. The SCN-RSP message 425 can include one or more of an optimized BS list, a first indicator that indicates a list of inaccessible base stations, and a second indicator that indicates a list of possibly accessible base stations. In some embodiments, when the SCN-RSP message 425 includes the first indicator of inaccessible base stations, BS 103 may not assign a scanning interval. BS 103 can determine whether to include the first indicator for inaccessible base stations or the second indicator for possibly accessible base stations based on whether the number of inaccessible base stations is much fewer than the number of accessible base stations. For example, BS 103 may include the first indicator and the list of inaccessible base stations in the SCN-RSP message 425 when the number of inaccessible base stations is fewer than the number of possibly accessible base stations. In response, SS 116 can determine the number of possible accessible base stations based on the list of inaccessible base stations. Thereafter, in block 430, SS 116 can perform scanning for accessible base stations. The scanning performed in block 430 can be autonomous or based on the SCN-RSP message 425. Then, SS 116 transmits a SCN-REP message 435 informing BS 103 regarding the results of the scanning performed in block 430.

Figure 5:
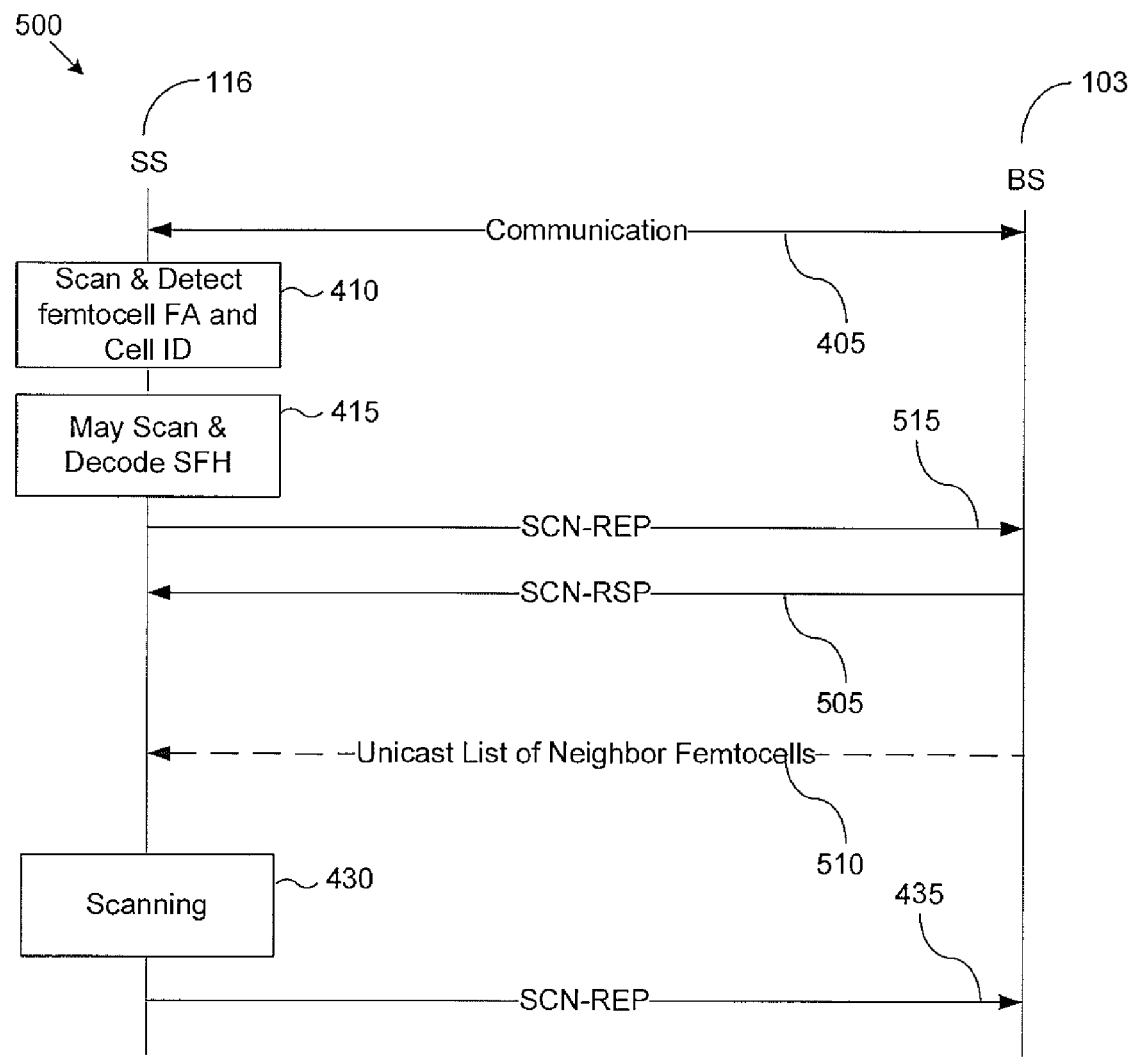
FIG. 5 illustrates an example of the scanning report and scanning response with an alternative neighbor list for optimized neighboring femto BSs according to embodiments of the present disclosure.

FIG. 5 illustrates an example of the scanning report and scanning response with an alternative neighbor list for optimized neighboring femto BSs according to embodiments of the present disclosure. The embodiment of the scanning report and scanning response with an alternative neighbor list 500 shown in FIG. 5 is for illustration only. Other embodiments could be used without departing from the scope of this disclosure.

In some embodiments, SS 116 sends desired CSGIDs based on white list 363 (with indicator 'not detected but in white list') in scanning request message 420 with neighbor request indication being '1', then BS 103 can respond a list of BSs indicated by FA and A-preambles, and/or BSIDs belonging to the requested CSGIDs in scanning response message (SCN-RSP message) 505. The SCN-RSP message 505 can be substantially similar to the SCN-RSP message 425 shown in FIG. 4, except the list can be further optimized if exact or approximated location information can be known. The CSGIDs from SS 116's white list 363 can be sent together with information to help optimize the list, such as, SS 116's location information, detected SA-preamble index and associated FA information, or detected BSID or CSGID.

In some embodiments, after scanning, SS 116 may report FA and preamble indices, or CSGID, BSIDs by sending a neighbor request message or scanning report (SCN-REP) 515 with neighbor request indication being '1'. In response, BS 103 can unicast a neighbor list in a neighbor list (NBR-ADV) message 510 or in a scan response message 505 with or without allocated scanning interval, where the list includes a list of femto base stations. The list of femto base stations can be formed based on the reported FA, A-preamble index, or CSG, BSIDs, location information, or the reported measurement, or any other recommended femto ABSs based on location information, or even the information from SS 116's white list 363. In the messages that include a list of femto base stations, an indicator of whether the femto BS is accessible to SS 116, or inaccessible to SS 116, may be included. The message can include inaccessible femto BSs, and accessible femto BSs. In some embodiments, if inaccessible BSs are much fewer than the accessible BS, BS 103 may only include the inaccessible BS in the message, and then SS 116 can determine the possible accessible femtocells, or vice versa. For inaccessible BS, the scan response may not assign any scanning interval.

Figure 6:
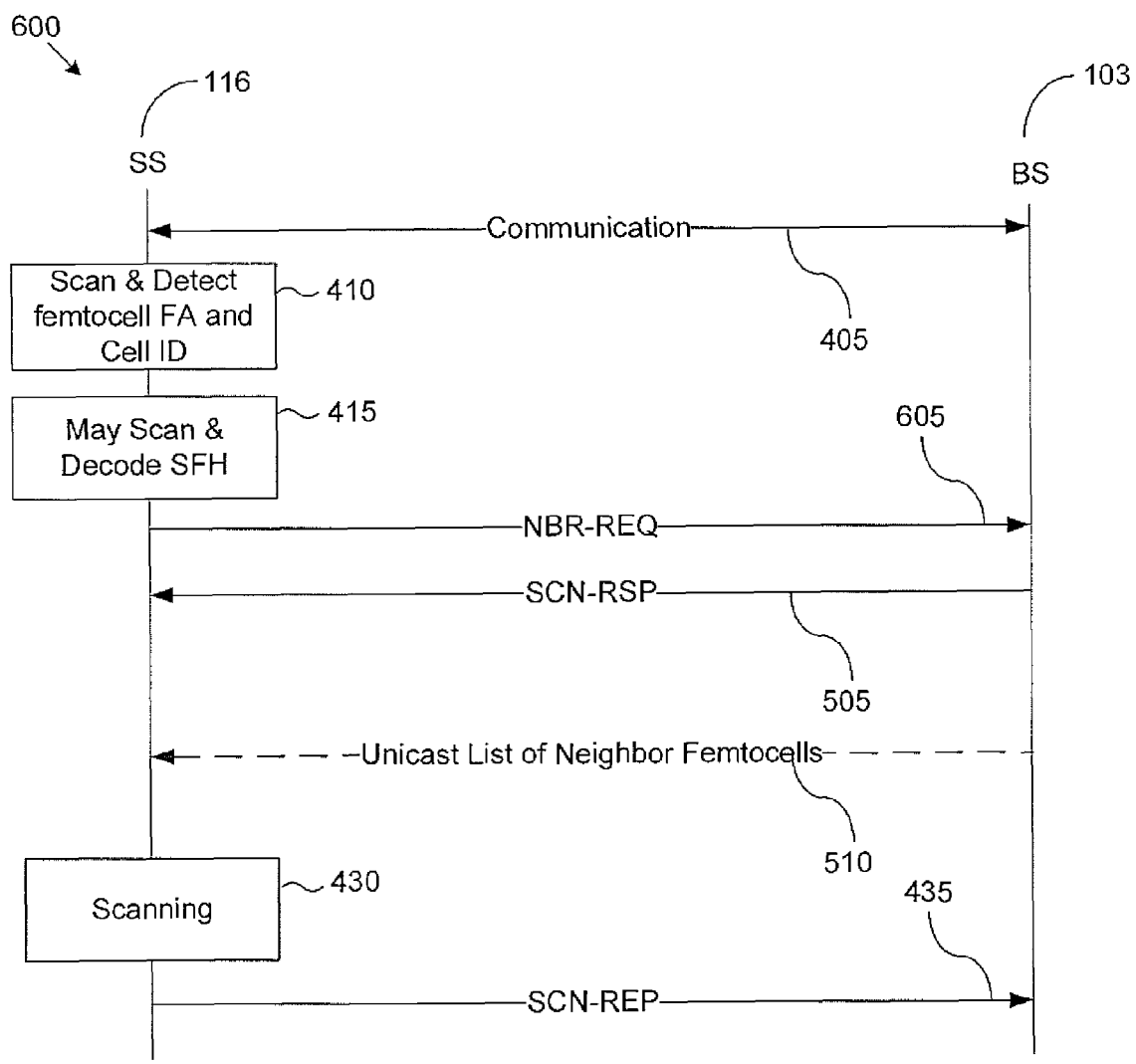
FIG. 6 illustrates an example of the neighbor request and scanning response with an alternative neighbor list for optimized neighboring femto BSs according to embodiments of the present disclosure.

FIG. 6 illustrates an example of the neighbor request and scanning response with an alternative neighbor list for optimized neighboring femto BSs according to embodiments of the present disclosure. The embodiment of the neighbor request and scanning response with the alternative neighbor list for optimized neighboring femto BSs 600 shown in FIG. 6 is for illustration only. Other embodiments could be used without departing from the scope of this disclosure.

In some embodiments, SS 116 can include information detected or based on white list, such as the FA, preambles, BSID, CSGIDs of the subscribed CSG femto BSs in the neighbor request (NBR-REQ) message 605, or SCN-REP message 515 with neighbor request indication being '1'. The NBR-REQ message 605, or SCN-REP message 515 with neighbor request indication being '1', includes one of: 1) the indicator '00', which indicates that the SA-preamble, BSIDs or CSGIDs is detected while AMS does not support items, such as SA-preamble or BSIDs or CSGIDs in the white list 363 or SS 116 does not have the capability of a white list 363; 2) indicator '01', which indicates detected but not in white list 363; 3) indicator '10', which indicates detected and in white list 363; and 4) indicator '11', which indicates not detected but in white list 363. The NBR-REQ message 605, or SCN- REP message 515 with neighbor request indication being '1', can include the location information of SS 116 if available (such as the location information based on the GPS, and the like). The cell type such as CSG-open, CSG-closed, open, and so forth, could also be indicated in the message for the BSs. The information can be used by BS 103 to help optimize the list of neighboring BSs.

In some embodiments, the scanning report (SCN-REP) 435 can include an accessible indicator of whether a detected base station is inaccessible or possibly accessible to SS 116. The accessible indicator can be used, for example, for the differentiation of handover case and interference mitigation case.

One or more, or all, of the indicators mentioned above may be jointly coded with other fields in the message.

In some embodiments, the information and/or indicators included in one or more of the SCN-REQ 420, SCN-REP 515, NBR-REQ 605, and so forth, can be applied to a handover request message, handover indication message, or any other messages from SS 116 to the serving BS 103, when SS 116 is to detect and select the femtocells.

In some embodiments, the SCN-RSP 425, 505 or SCN-REQ 420, can use a two-bit bit map of the indicator for: 1) the scan purpose; 2) to indicate whether it is for the BS in a NBR list or not; or 3) to indicate both whether the BS is in NBR list or not in NBR list.

For example, the 2-bit scan purpose bit map can be configured such that: bit #1: includes a '1' indicating that the BS is in NBR list; and bit#2: includes a '1' indicating that BS is not in NBR list. If bit #1 is '1', the list includes the fields related to the scanning based on the NBR list. If bit #2 is '1', the list includes the fields related to the scanning not based on the NBR list.

In some embodiments, if the number of the cell IDs of CSG femto that SS 116 detects is less than a threshold, then SS 116 can proceed to scan the SFH (for example, block 415) rather than reporting back to the serving BS, BS 103, for further optimized accessible femto BS neighbor list.

In some embodiments, the FBS 160 may broadcast the CSG femtos in its neighbor list. The CSG femtos may be arranged based on FA, CSGID, BSID, and so forth.

In some embodiments, when BS 103 sends unicast/multicast/broadcast messages including the list of the femtos, BS 103 includes an indicator of whether the femto is in normal operation mode or in low duty mode (or some other TX reduction mode).

Figure 7:
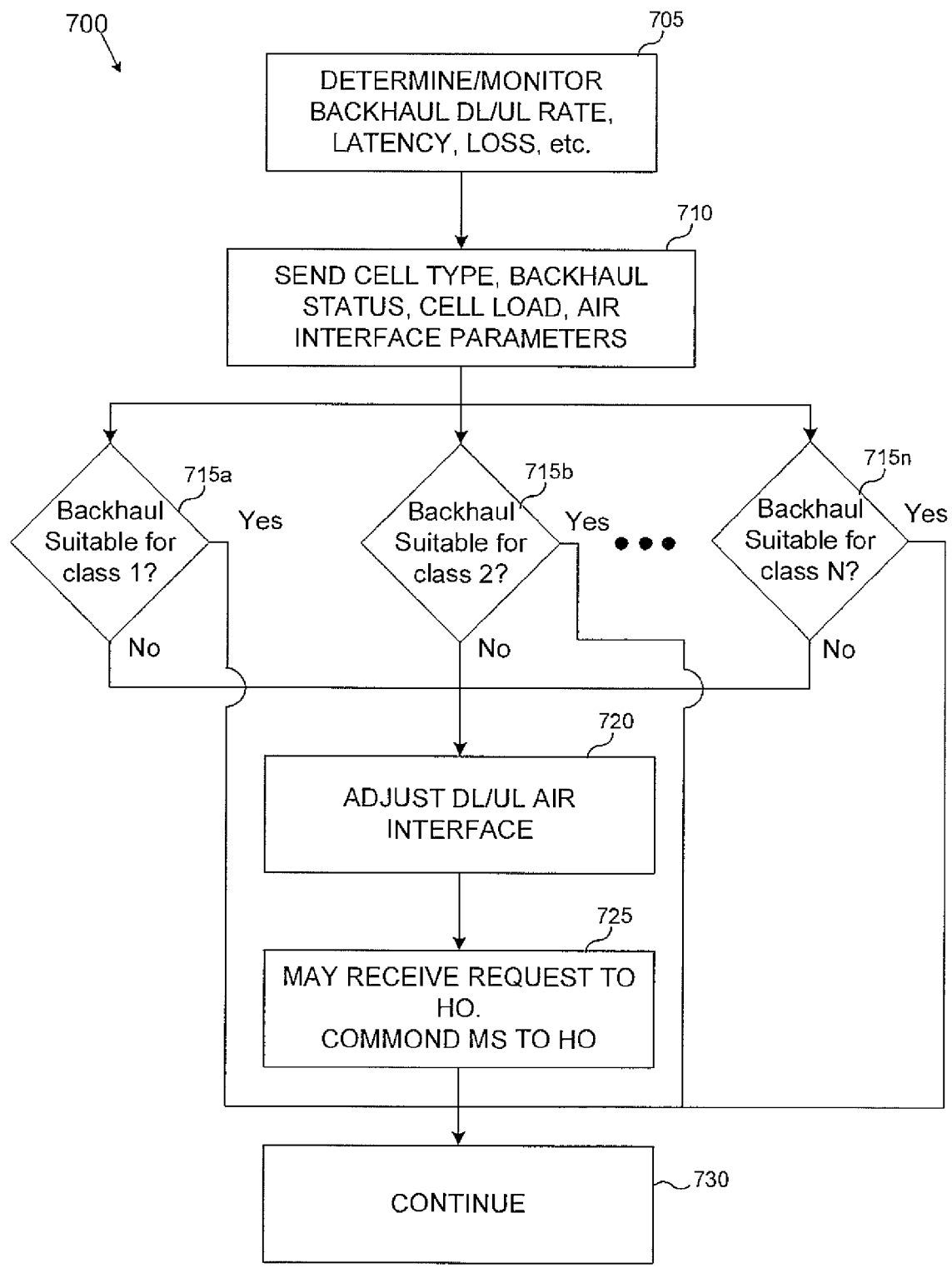
FIG. 7 illustrates an example process for cell selection and cell adjustment according to embodiments of the present disclosure

FIG. 7 illustrates an example process for cell selection and cell adjustment according to embodiments of the present disclosure. The embodiment of the cell selection and cell adjustment process 700 shown in FIG. 7 is for illustration only. Other embodiments could be used without departing from the scope of this disclosure.

In some embodiments, for BS selection, SS 116 prefers (e.g., prioritizes) its subscribed femto BS over another type of base station so long as SS 116 has a low velocity to be associated with its subscribed FBS. SS 116 can select (e.g., prioritize or otherwise indicate a preference for) an open subscriber group (OSG) femto over a CSG-open femto if SS 116 is a non-member of the CSG-open femto.

The selection of the base station, such as FBS 160, may not be only be related to the velocity of SS 116, subscription, and the type of FBS 160, but also be related to the backhaul capability (rate, delay, loss, and so forth), cell load, subscriber station required SINR, FBS 160 transmitting power, FBS 160 maximum transmitting power, SS 116 maximum transmitting power, and so forth. Such information can be used by SS 116 to select a path as well.

In the example shown in FIG. 7, SS 116 can choose a macro, such as BS 103, or other base station if its preferred subscribed CSG femto, FBS 160, has very bad backhaul connection, or a very heavy load.

In block 705, the backhaul downlink/uplink rate is monitored or otherwise determined. In some embodiments, one or more of the latency, loss, and the like, can be monitored or determined.

In some embodiments, for the selection and reselection purposes, FBS 160 can send the backhaul conditions to the MSs in its service (e.g., SS 116) in block 710. The backhaul conditions can include the rate, delay, loss, and so forth, the load of the cell, subscriber station required SINR, base station tx power, and so forth. The backhaul conditions can be sent to SS 116 to enable SS 116 to make the decision regarding which cell to choose.

In blocks 715*a*-*n*, FBS 160 determines if the backhaul is suitable for a respective class of communication. For example, in block 715*a*, SS 116 determines whether the backhaul is suitable for Class 1 communications based on the VoIP required rate/latency. In block 715*b*, FBS 160 determines whether the backhaul is suitable for Class 2 communications based on whether the rate is higher than the minimum requirement of quality of service (QoS) Class 2. In block 715*n*, FBS 160 determines whether the backhaul is suitable for Class N communications based on whether the rate is higher than the minimum requirement of quality of service (QoS) Class N.

If FBS 160 determines that the backhaul is not suitable with regard to a respective class in blocks 715*a*-*n*, then adjustments to the air interface transmission are made in block 720. The air interface transmission can be adjusted to match-up the backhaul condition. For example, one or more of the power, duty cycle, resource allocation, and so forth, can be adjusted. FBS 160 may also signal MSs served by it regarding the air interface adjustment.

In some embodiments, SS 116 determines to request to handover to other base stations if some conditions are met, such as the backhaul of FBS 160 is weak, FBS 160 has weak signal, and so forth. FBS 160 may receive a request from SS 116 to handover to another possible base station in block 725. If a handover request is received, FBS 160 can send handover command to the SS 116 to perform handover. Alternatively, if a handover request is not received, and when FBS 160 determines that it is better to hand SS 116 over to other base stations, FBS 160 can send handover command to SS 116.

If FBS 160 determines that the backhaul is suitable with regard to a respective class in blocks 715*a*-*n*, then the process continues in block 730. Additionally, after adjustments are made to the air interface in block 720 or FBS 160 receives a request to handover in block 725, the process continues in block 730.

In some embodiments, an indicator is included in one of the messages that provides indication of neighbor request, re-direct information, inaccessible/accessible, white list not supported, detected and in (or, not in) white list, not detected but in white list, in the messages/signaling.

SS 116 can autonomously detect one or more of FBS 160-175 by scanning A-preamble. SS 116 obtains Cell ID (Cell ID is the SA-preamble index).

In a first example ("case 1") SS 116 includes a white list 363 that contains FA and Cell ID of subscribed CSGs. SS 1160 checks whether the detected Cell ID and associated FA for FBS 160 are in the white list 363. If yes, SS 116 can further scan for SFH. If the detected Cell ID and associated FA for FBS 160 are not in the white list 363, SS 116 will not scan for SFH. If the number of the detected Cell IDs in the white list 363 is greater than a threshold, SS 116 can further detect the SFH of some femto BSs, and report to the BS 103. The report can be in NBR-REQ, or SCN-REP, SCN-REQ. BS 103 then can estimate the location of SS 116 and can respond with an optimized NBR list. Alternatively, SS 116 can report the detected Cell IDs to BS 103, and BS 103 can initiate a coordinated specific ranging process, so that some of FBS 160-175 can hear the ranging from SS 116. The femto base stations, such as FBS 160 and FBS 165 that hear the ranging from SS 116 can, in response, inform BS 103. SS 116 can scan further for SFH for only those femto base stations that can hear the special ranging, e.g., FBS 160 and FBS 165.

In a second example ("case 2"), the local white list 363 in SS 116 does not contain Cell ID of subscribed CSGs. If the number of the cell IDs of CSG femto that SS 116 detects is less than a threshold, then SS 116 scans the SFH without reporting back to the BS 103 for a further optimized accessible femto BS neighbor list. In some embodiments, SS 116 can report detected Cell ID and associated FA, such as FBS 160-170, to BS 103, and BS 103 can check which femto with the reported Cell ID and associated FA is accessible to SS 116. For example, BS 103 can determine that FBS 160 and FBS 165 are accessible to SS 116. Then, BS 103 can respond back to SS 1106 with a Response containing information regarding the accessible femto base stations, e.g., FBS 160. The Response can be in the form of accessible Cell IDs, or inaccessible Cell IDs, and the Cell IDs can be simplified as the indices in the report. SS 116 can choose to detect SFH of some of the femto BSs, e.g., FBS 160, then check the white list 363 based on BSID or CSG ID, report back to BS 103. The report can be in NBR-REQ, or SCN-REP, SCN-REQ. BS 103 then can estimate the location of SS 116 and can respond with an optimized NBR list. Alternatively, SS 116 can report the detected Cell IDs to BS 103, and BS 103 can initiate coordinated specific ranging process, so that some of FBS 160-175 can hear the ranging from SS 116. The femto base stations, such as FBS 160 and FBS 165 that hear the ranging from SS 116 can, in response, inform BS 103. SS 116 can scan further for SFH for only those femto base stations that can hear the special ranging, e.g., FBS 160 and FBS 165.

SS 116 can send detected Cell IDs in SCN-REQ. Then in SCN-RSP, BS 103 can respond with a list of accessible BSs and inaccessible BSs. For inaccessible BS, BS may only indicate the accessibility, not assigning any scanning interval.

Alternatively, SS 116 can have the Cell ID of a subscribed femto stored in white list 363. SS 116 then can check whether the detected cell ID is in the white list, if it is not, then the detected cell is an inaccessible cell. In SCN-REQ, MS may send only those detected cell ID in white list, or it may send all the detected cell IDs with optionally indicating which are in the white list which are not, to provide more information to BS. These could be combined to simplify if MS/BS location is known.

In some embodiments, the SCN-RSP can also include an indicator of accessible base stations and inaccessible base stations, to save MS from scanning the SFH to check the accessibility based on CSGID or BSID.

When SS 116 is trying to perform initial network entry, or network re-entry, with a FBS 160, SS 116 first performs initial ranging by sending AAI_RNG-REQ messages. SS 116 can include CSG ID and BSID as part of the AAI_RNG-REQ message to FBS 160 if one or more CSGID(s) and/or subscribed BSIDs are provided in the white list 363.

In some embodiments, all the CSG ID can be replaced by CSGID and/or subscribed BSIDs. In order to help SS 116 to attach to FBS 160 (e.g., a nearby femto ABS), FBS 160 provides "redirection info" to SS 116 in the AAI_RNG-RSP message. An indicator of the 'redirection info' should be included in 'AAI_RNG-RSP'. When the indicator of the 'redirection info' is '1', then the ranging response is for redirection. When the indicator of the 'redirection info' is '0' then the ranging response is a normal response.

SS 116 can include, in the AAI_RNG-REQ message, information detected base stations or based on white list 363, such as, the FA, preambles, BSID, CSGIDs of the subscribed CSG femto BSs. The AAI_RNG-REQ message can include an indicator=00 that indicates whether the SA-preamble, BSIDs or CSGIDs is detected when SS 116 does not support items such as SA-preamble or BSIDs or CSGIDs in the white list 363 or SS 116 does not have the capability of white list 363; an indicator=01 that indicates detected but not in white list 363; an indicator=10 that indicates detected and in white list 363; and an indicator=11 that indicates not detected but in white list. The information can help optimize the list of the redirection info.

SS 116 can request additional scanning opportunities by sending AAI_SCN-REQ, which includes the detected SA-preamble index and associated FA information, and/or BSID, CSGID. The AAI_SCN-REQ also indicates whether it is for the neighbor request or just for an accessibility check for reported ABSs. Upon reception of the AAI_SCN-REQ with neighbor request indication set to '1', BS 103 responds with an AAI_SCN-RSP that includes a neighbor accessible Femto ABS list based on the SA-preamble index. The neighbor accessible Femto ABS list can include information such as SA-preamble, FA, BSID, CSGID, and the like. Upon reception of the AAI_SCN-REQ with neighbor request indication set to '0', BS 103 responds with an AAI_SCN-RSP instructing the accessibility of the ABSs indicated in the received AAI_SCN-REQ. AAI_SCN-RSP can include an indicator that indicates whether the ABS is inaccessible or possibly accessible to SS 116. BS 103 may choose to only inform SS 116 regarding the inaccessible ABS's. Alternatively, BS 103 may choose to inform SS 116 regarding the possibly accessible ABS. BS 103 can choose whether to inform SS 116 regarding the inaccessible ABS's or the possibly accessible ABS based on which method is more efficient.

The AAI_SCN-REQ message can include an indicator=00 that indicates whether the SA-preamble, BSIDs or CSGIDs is detected when AMS does not support items such as SA-preamble or BSIDs or CSGIDs in the white list or AMS does not have the capability of white list 363; the indicator=01 that indicates detected but not in white list 363; the indicator=10 that indicates detected and in white list 363; and the indicator=11 that indicates not detected but in white list 363.

SS 116 AMS sends desired CSGIDs based on the white list 363 (with indicator 'not detected but in white list') in AAI_SCN-REQ with neighbor request indication set to '1', then BS 103 can respond with a list of ABSs indicated by FA and A-preambles, and/or BSID belonging to the requested CSGIDs in AAI_SCN-RSP message. The list can be further optimized if exact or approximated location information can be known. The CSGIDs from the white list 363 can be sent together with information to help optimize the list, such as, detected SA-preamble index and associated FA information, or detected BSID or CSGID.

After scanning, SS 116 can report FA and preamble indices, or BSIDs by sending AAI_NBR-REQ or AAI_SCN-REP with neighbor request indication set to '1', to which BS 103 can unicast an AAI_NBR-ADV that includes a list of femto ABSs which is formed based on the reported FA, A-preamble index, or BSIDs, or the reported measurement, or any other recommended femto ABSs based on location information.

SS 116 can include information detected or based on white list, e.g., the FA, preambles, BSID, CSGIDs of the subscribed CSG femto BSs in the AAI_NBR-REQ message. AAI_NBR-REQ message should include the indicator=00 that indicates whether the SA-preamble, BSIDs or CSGIDs is detected when SS 116 does not support items such as SA-preamble or BSIDs or CSGIDs in the white list or SS 116 does not have the capability of white list 363; the indicator=01 that indicates detected but not in white list 363; the indicator=10 that indicates detected and in white list 363; and the indicator=11 that indicates not detected but in white list 363.

SS 116 can include location information if available in AAI_NBR-REQ. The location information can be the information obtained from a GPS within SS 116. The AAI_SCN-REP can include an indicator of whether BS 103 is inaccessible or possibly accessible to SS 116. In some embodiments, one or more of the indicators mentioned herein above can be jointly coded with other fields in the message.

In some embodiments, in the AAI_SCN-REQ/RSP, bit of the indicator is changed from the one bit of the indicator, which indicates whether the scan purpose is for BS 103 in NBR list or not, into a two-bit bit mapping of the indicator for the scan purpose. In the scan purpose bit map (2-bit): bit #1: set to '1' indicating for BS in NBR list; bit#2: set to '1' indicating for BS not in NBR list. If purpose bit #1 is '1', the fields related to the scanning based on NBR list are included. If purpose bit #2 is '1', the fields related to the scanning not based on NBR list are included.

In some embodiments, the white list 363, stored locally within SS 116, contains information about the SS 116 subscribed CSG femto BS, FBS 160. The information about FBS 160 can include CSG ID, FA, BS location, BS ID, Cell ID, Nickname, low duty mode pattern, Overlaid macro BSID, and the like. Based on the white list 363, when SS 116 can detect or receive any relevant information about the white list 363, SS 116 can refine the search scope on its own. For example, if SS 116 detects an overlay macro, then SS 116 can judge: 1) which femtos are not possibly in SS 116's proximity and which are possible; or 2) which femtos detected is its subscribed femtos or which are not (may jointly decide with the information received/detected from the femtos, such as FA/cellID/BSID, and the like).

Alternatively SS 116 can determine its own location and compare the locations of the subscribed femto base stations. Then, SS 116 can refine which subscribed femtos are in its proximity or neighborhood and which are not and which detected femtos are subscribed or not. SS 116 may jointly decide with the information received/detected from the femtos, such as FA/cellID/BSID, and the like.

In some embodiments, a BS 103 (e.g., the serving ABS or an overlay Macro ABS) may recommend that FBS 160 (an accessible CSG Femto ABS) monitor UL signaling of SS 116, that is, the member subscriber stations that are served by the BS 103. BS 103 can further select a set of the accessible CSG Femto ABS, such as FBS 160 and FBS 165, for SS 116 based on SS 116's location information, or detected base station information reported by the SS 116, if such information is available, before BS 103 recommends the FBS 160 to monitor UL signaling. If the set of the accessible CSG Femto ABS selected by BS 103 is empty, BS 103 does not recommend any CSG Femto ABS to monitor UL signaling.

When a set of trigger conditions is satisfied, such as when the received signaling quality (such as, RSSI) of SS 116 is stronger than a threshold, or when the received signaling quality (RSSI) of SS 116 is relatively stronger than the other ABS (such as BS 103), FBS 160 (the CSG Femto ABS) can request that BS 103 (the overlapped Serving ABS) send an unsolicited AAI_SCN-RSP for SS 116 to scan FBS 160. Such thresholds or trigger conditions may be adjusted based on the transmitting power at SS 116. The transmitting power could be signaled from SS 116 to the network, in the messages, and/or via backhaul 180, and the like, to FBS 160. Alternatively, the transmitting power could be sent from BS 103 via backhaul 180 to FBS 160. For example, the ranging message could include a field for transmitting power of SS 116. Based on the transmitting power of SS 116, as compared with the received power, and the adaptive trigger conditions or the threshold, FBS 160 can decide whether to request that BS 103 notify SS 116 to scan. Alternatively, SS 116 AMS can by default using its maximum power to transmit, while the maximum power should be notified to FBS 160, via SS 16, or backhaul 180, and so forth.

Alternatively, BS 103, as the overlay macro base station, can recommend FBS 160, as an accessible CSG Femto ABS, to monitor UL signaling of SS 116, its member AMS, which is served by BS 103. BS 103 can further select a set of the accessible CSG Femto ABS (e.g., FBS 160-165) for SS 16 based on SS 116 location information, or detected base station information reported by SS 116, if such information is available, before BS 103 recommends that FBS 160 monitor UL signaling. If the set of the accessible CSG Femto ABS selected by BS 103 is empty, BS 103 does not recommend any CSG Femto ABS to monitor UL signaling. If FBS 160 (the CSG femto ABS) is in low-duty mode, FBS 160 can try to receive A-MAP information from BS 103 and then monitor SS 116 (its member AMS's) UL signaling in associated allocations. If FBS 160 is not in low-duty mode, BS 103 can trigger common dedicated periodic ranging for the AMS to range the femtos. FBS 160 can monitor the ranging preamble at the dedicated ranging slot of BS 103.

When the received signaling quality (such as, RSSI) of SS 116 is stronger than a threshold, FBS 160 can request that BS 103 send an unsolicited AAI_SCN-RSP for SS 116 to scan FBS 160. The threshold may be adjusted based on the transmitting power at SS 116, while the transmitting power could be signaled from SS 116 to the network 100, in the messages, or via backhaul 180, and so forth. The ranging message could include a field for transmitting power of SS 116.

In some embodiments, if SS 116 wants to send CSGID/BSID in the RNG-REQ, SS 116 sends all these IDs in its white list 363. There could be an indicator in RNG-REQ to indicate that SS 116 sends part of all CSGIDs. In some embodiments, SS 116 either sends all, or part of all, CSGIDs by default. In some embodiments, SS 116 is mandated to send all the CSGID/BSID in its white list 363.

If BS 103 receives the RNG-REQ with an indicator indicating that the all CSGID/BSID in the white list 363 are sent, then BS 103 can decide to reject the request if none of the received CSGID/BSID matches its own, and accepts the request if any of the CSGID/BSID received matches its own.

If BS 103 receives the RNG-REQ with an indicator indicating that NOT all CSGID/BSID in the white list 363 are sent, BS 103 does not decide on whether to reject it; however, BS 103 can accept the request if any of the CSGID/BSID received matches its own.

In some embodiments, SS 116 can request additional scanning opportunities by sending AAI_SCN-REQ including the detected SA-preamble index and associated FA information, and/or BSID, CSGID, and indicate whether it is for the neighbor and scanning request, or just for a regular scanning request. Upon reception of the AAI_SCN-REQ with neighbor and scanning request indication being '1', BS 103 responds with an AAI_SCN-RSP including neighbor accessible Femto ABS list based on the SA-preamble index. The neighbor accessible Femto ABS list may include information, such as SA-preamble, FA, BSID, CSGID, and the like. Upon reception of the AAI_SCN-REQ with neighbor and scanning request indication set to '0', BS 103 responds with an AAI_SCN-RSP regularly without optimizing a neighbor list for SS 116. The AAI_SCN-RSP can include an indicator to indicate that the message is a regular SCN-RSP.

In some embodiments, SS 116 can include location information in AAI_SCN-REQ with the neighbor request indication set to '1', or AAI_SCN-REP with neighbor request indication set to '1', or AAI_NBR-REQ. The location information can be information obtained from a GPS unit within SS 116. The location information, and/or the reported detected base station information, and/or the information of the white list 363, can be used by BS 103 to optimize the neighbor list.

In some embodiments, when BS 103 receives AAI_NBR-REQ, or AAI_SCN-REP/AAI_SCN-REQ with an indication that a neighbor list optimization may be needed, such as by the scanning purpose indicators implication, or explicit indication such as the indicator of 'NBR request' being set to '1', BS 103 responds with AAI_SCN-RSP with 'response for the neighbor request' indication bit set to '1'. The AAI_SCN-RSP can contain an indication of 'response for the neighbor request' indication. If the indicator responding for the neighbor request is '1', in AAI_SCN-RSP, the AAI_SCN-RSP can contain both the optimized neighbor list and some scanning interval recommendations for some of the ABSs in the optimized neighbor list. If the indicator is '0', it is a normal AAI_SCN-RSP. The SCN-REP and NBR-REQ messages can include similar changes.

Tables 1 through 4 indicate parameters for the messages. For example, Table 1 includes some parameters for AAI_SCN-REQ message; Table 2 includes some parameters for AAI_SCN-REP message; Table 3 includes some parameters for AAI_NBR-REQ message; and Table 4 includes some parameters for AAI_SCN-RSP message.

TABLE 1

| Name | Value | Usage |
|---|---|---|
| Scan duration | Duration (in units of AAI subframes) of the requested scanning period. | |
| Scan Purpose | Scan purpose bit map (2-bit): bit # 1: being '1' indicating for BS in NBR list; bit#2: being '1' indicating for BS not in NBR list. | If purpose bit #1 is '1', including the fields related to the scanning based on NBR list<br>If purpose bit #2 is '1', including the fields related to the scanning not based on NBR list |
| Neighbor list request indication<br>[NOTE] This indication can be omitted if we assume that the ABS will always optimize a neighbor list for the AMS if in the scan purpose it is indicated that the AMS requests the ABS not in the NBR list. | '1' requesting neighbor list<br>'0' not requesting neighbor list | |
| Interleaving Interval | The period of AMS's normal operation which is interleaved between Scan Durations. | |
| ... | ... | ... |
| If scan purpose bit #1='1',<br>{<br>list of ABSs based on the AA1_NBR-ADV<br>...<br>}<br>If scan purpose bit #2='1',<br>{<br>list of ABSs not on the AA1_NBR-ADV | | |
| MS Location information indicator | '1' MS GPS information available<br>'0' MS GPS information not available | Include when Neighbor list request indication is '1' |
| MS location information | Location information:<br>Latitude<br>Longitude<br>Or Other coordinate system<br>MS Speed | Include when Neighbor list request indication is '1' and MS location information indicator is '1' |
| ...<br>} | ... | ... |

TABLE 2

| Name | Value | Usage |
|---|---|---|
| Neighbor list request indication | '1' requesting neighbor list<br>'0' not requesting neighbor list | |
| MS Location information indicator | '1' MS GPS information available<br>'0' MS GPS information not available | Include when Neighbor list request indication is '1' |
| MS location information | Location information:<br>Latitude<br>Longitude<br>Or Other coordinate system<br>MS Speed | Include when Neighbor list request indication is '1' and MS location information indicator is '1' |

TABLE 2-continued

| Name | Value | Usage |
| --- | --- | --- |
| Report mode | Action code for an AMS's scan report of its measurement<br>0: Event-triggered report<br>1: Periodic report according to Scan report period of AAI_SCN-RSP | |
| ... | ... | ... |

TABLE 3

| Name | Value | Usage |
| --- | --- | --- |
| CSG1D in the white list at the MS | | |
| MS Location information indicator | '1' MS GPS information available<br>'0' MS GPS information not available | |
| MS location information | Location information:<br>Latitude<br>Longitude<br>Or Other coordinate system<br>MS Speed | Include when Neighbor list request indication is '1' and MS location information indicator is '1' |
| Report detected ABSs | | |
| ... | ... | ... |

TABLE 4

| Name | Value | Usage |
| --- | --- | --- |
| Scan duration | Duration (in units of AA1 subframes) of the requested scanning period. | |
| Scan Purpose | Scan purpose bit map (2-bit): bit # 1: being '1' indicating for BS in NBR list; bit#2: being '1' indicating for BS not in NBR list. | If purpose bit #1 is '1', including the fields related to the scanning based on NBR list<br>If purpose bit #2 is '1', including the fields related to the scanning not based on NBR list |
| Respond to neighbor list request indication | '1' respond to neighbor request (AA1_NBR-REQ, or AA1_SCN-REP with neighbor list request indication as '1', or AAI_SCN-REQ with neighbor list request indication as '1')<br>'0' not a response to neighbor list request | |
| If "Respond to neighbor list request indication"=1{<br>List of optimized neighbor femtocells, including the indicator of whether the femtocell is accessible or inaccessible to the AMS.<br>...<br>} | | |

In some embodiments, SS 116 is configured to detect FBS 160 (its subscribed femto base station) while saving battery life by avoiding unnecessary scanning. In some embodiments, small cells, such as femtocell, can have a new state which can be TX off and RX on, if no MS is served by the cell. For example, the femtocell owner leaves home for office, the home femtocell may not be used, and the femtocell can be in TX off and RX on state. When everyone leaves the office after work, the office femtocell may not be used and the femtocell can be in TX off and RX on state. When the femtocell owner is getting back home, the home femtocell may then be exiting from the state of TX off, and go back to a state of some TX on or full TX on. The office femto may be exiting from the state of TX off, and go back to a state of some TX on or full TX on, when employees come back to work. In some embodiments, technologies to enable automatic femtocell TX on and off based on whether there are subscribed mobile station nearby, are provided.

Figure 8:
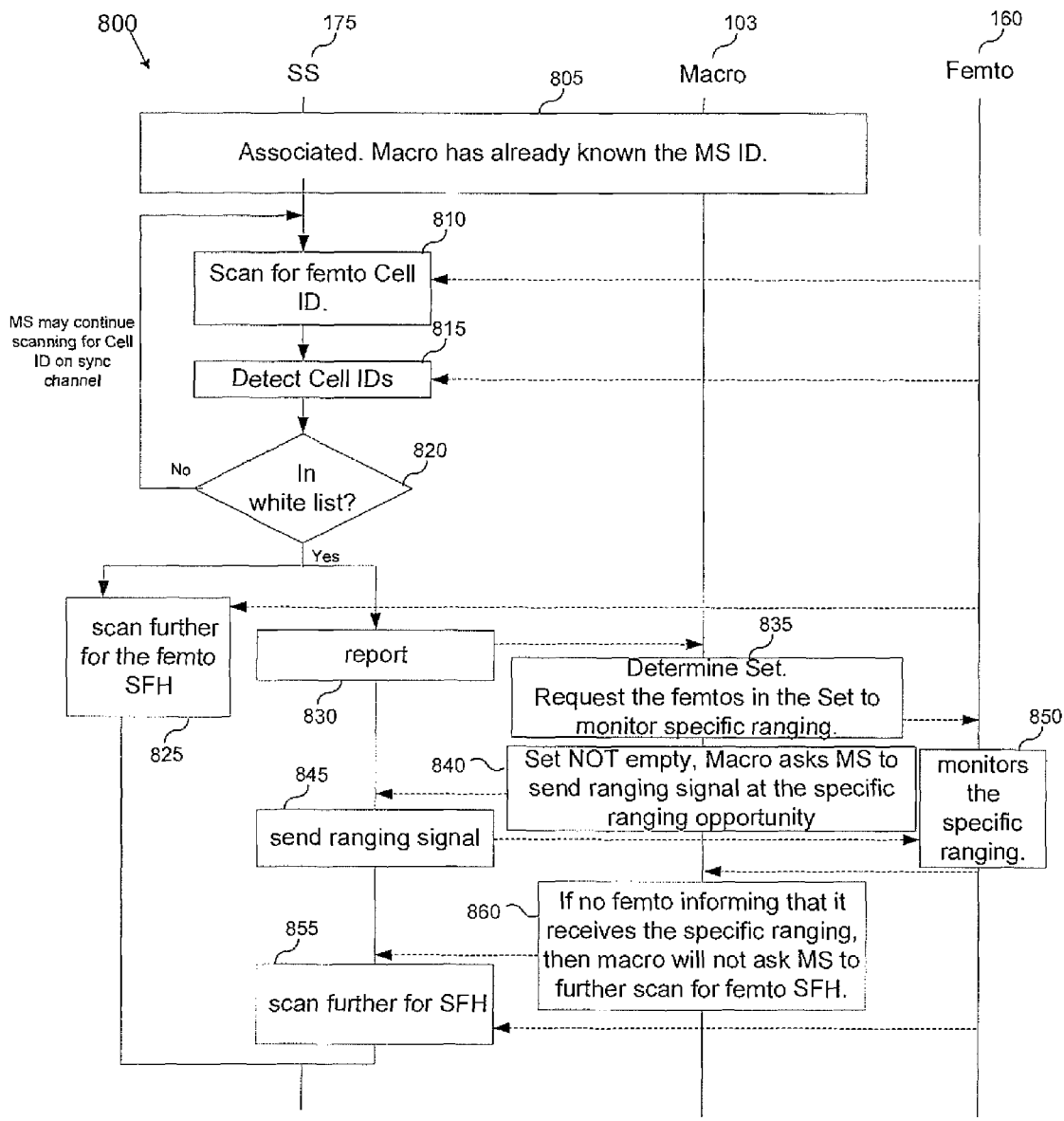
FIG. 8 illustrates a process for detecting a femto base station according to embodiments of the present disclosure.

FIG. 8 illustrates a process for detecting a femto base station according to embodiments of the present disclosure. The embodiment of the process for detecting a femto base station 800 shown in FIG. 8 is for illustration only. Other embodiments could be used without departing from the scope of this disclosure.

In the example shown in FIG. 8, BS 103 already knows the MS ID for SS 116 in block 805. BS 103, the network 100, or both, check whether there exists any underlaid CSG femto subscribed by the MS in the coverage area 125 of BS 103. If no subscribed femto base stations are located within the coverage area 125, BS 103 can ask SS 116 not to scan for any CSG femto base stations. If the white list 363, stored in SS 116, includes a CSG femto underlay macro ID, then SS 116 can decide on its own whether to scan for CSG femto base stations based on the macro ID.

SS 116 locally stores a white list 363 that contains the information about the subscribed CSG femto BS, (e.g., CSG ID, FA, BS location, BS ID, Cell ID, Nickname, low duty mode pattern, Overlaid macro BSID, and the like). In block 810, SS 116 can scan FBS 160 (its subscribed CSG femto) based on the white list 363. SS 116 can scan CSG femto based on the FA included in the white list 363, and, in block 815, detect Cell ID for FBS 160-175 (may include both CSG-open and CSG-closed femto). In block 820, SS 116 determines if the detected Cell ID and associated FAs are in the white list 363. If the detected Cell ID and associated FA are not in the white list 363, then SS 116 may continue search for other Cell ID and FA in block 810. If the detected Cell ID and associated FA are in the white list 363, SS 116 can choose, in block 825, to further scan SFH or broadcast channel, so that SS 116 can find some IDs (such as BSID) to verify whether SS 116 is a subscriber of the CSG.

In block 830, SS 116 reports to BS 103. However, SS 116 MS may choose not to report if the detected Cell ID(s) and FA(s) are not in its white list 363.

BS 103, the network 100, or both, determines, under its coverage, a set of those FBS (such as FBS 160-170) that are subscribed by SS 116 and have the reported Cell ID(s) and associated FA(s) in block 835. BS 103, the network, or both, in block 835, can refine the set of possibly accessible base stations based on the location information of SS 116, if available. The location information can be for example, GPS information received from SS 116, the approximated location information based on the reported femto BSs (e.g., reported cell ID, BSID, and so forth, that SS 116 detects). For example, BS 103 can pick-up femtos possibly nearby SS 116 from the set of those FBS (FBS 160-170). Network entity such as BS 103 then requests the set of those FBS (FBS 160-170) monitor a specified uplink signaling, such as a specific ranging opportunity, in block 835. In addition, the request to monitor can be used to wake up one or more of FBS 160-170. If the set of those FBS (FBS 160-170), or the refined set, is empty, BS 103 can choose not to initiate the specific ranging process.

BS 103 may coordinate with FBS 160, which is subscribed by SS 116, and have the reported Cell ID and associated FA. Alternatively, BS 103 can coordinate with the network 100 such that BS 103, the network 100, or both, can determine the specific ranging opportunity.

After the ranging opportunities are determined, in block 840, BS 103 asks SS 116 to send ranging signal at the specific ranging opportunity. SS 116 then sends the ranging signal at the specific ranging opportunity in block 845. Given one report on detected Cell IDs sent by SS 116, SS 116 can perform limited times of the specific ranging, such as one time, one shot repeated M times, periodically repeated N times, until a new report is sent, or until a new set of Cell IDs is detected.

In block 850 FBS 160-170 (that is, femtos who are subscribed by the MS and have the reported Cell ID and associated FA), which are asked to monitor the specific ranging opportunity, monitor the specific ranging. If FBS 160 detects the signal, FBS 160 informs BS 103. The signal (e.g., ranging signal at the specific ranging opportunity) can be used to wake up FBS 160.

When a set of trigger conditions are met, FBS 160 can request that BS 103 send a signal or message for SS 116 to scan the FBS 160. For example, the trigger conditions can be the received signaling quality such as an RSSI, SINR or the like. When the received signaling quality of SS 116 is stronger than a threshold, FBS 160 can request BS 103 to signal SS 116 to scan FBS 160.

In block 855, SS 116 scans further for SFH of FBS 160, the femto appointed by BS 103. SS 116 scans for SFH of FBS 160 for cell selection or cell reselection. FBS 160 is a subscribed femto for SS 116.

If no FBS informs BS 103 that it receives the specific ranging, as shown in block 860, then BS 103 does not ask SS 116 to scan for femto SFH. That is, only when an FBS informs BS 103 that it receives the specific ranging, then BS 103 asks SS 116 to scan the FBS that detected the specific ranging.

As such, SS 116 can reduce unnecessary scanning for the broadcast channel (BCH) of an inaccessible base station. In addition, fewer femto base stations will be involved in monitoring the ranging. Furthermore, in some embodiments, SS 116 only sends one shot of the ranging signal per report of detected Cell IDs, which can save battery charge as compared with a periodical ranging.

In some embodiments, the specific ranging opportunity can be the ranging opportunity of the BS involved, such as the macro or femto. If multiple femtos are involved, the ranging can be a common ranging for all these femtos, or different ranging opportunities for different femtos in which the femtos know the rule of how the ranging opportunities are mapped to the femto BSs.

The specific ranging opportunity can be signaled by the BS 103 to SS 116, or predefined or figured as a function of the system information such as MS ID, Cell ID, BS ID, and so forth. Therefore, SS 116 can determine the specific ranging opportunity without further assistance from BS 103 (that is, on its own). If the ranging opportunity is common for many BSs, the ranging opportunity can be some predefined or reserved ranging opportunity, a common ranging opportunities dynamically assigned, or a function of some system information common to these BSs, such as the overlay macro BS ID, cell ID, and the like.

The specific ranging opportunity can include the ranging channel defined in time and frequency. A specific ranging code can be used. The ranging code can be different for different subscriber stations, or it can be the same. For example, the ranging code can be reserved.

The specific ranging code can be the outcome of a mapping of subscriber station identification, which can be understood as subscriber station dedicated ranging. The same mapping can be known by the base stations to which the ranging channel belongs, such that the base stations can determine which subscriber stations is ranging from the ranging code.

SS 116 can send the ranging signal (code) on a ranging opportunity using a certain transmit (TX) power. The TX power can be signaled to the base stations that are monitoring the ranging. The TX power can be predefined or fixed such that subscriber stations and base stations know the predefined value. The TX power also can be a function/mapping of some system information and such function/mapping can be predefined and known by subscriber stations and base stations, such that they can figure out the value of TX power. For example, the function/mapping can be a mapping from the SS/BS types to the TX power, e.g., laptop, or cellphone could use different level of TX, or ranging to macro or pico or femto may require MS to use different level of TX power, and the like. By knowing the Tx power, BS 103 can estimate whether SS 116 is in close proximity. The trigger conditions, such as the value of RSSI threshold at BS 103, which monitors the specific ranging, can be configurable by the TX power level.

In some embodiments, when SS 116 is associated with BS 103, as the serving BS, BS 103 knows the MS ID. BS 103, the network 100, or both, can determine whether, in this macro coverage area 125, any underlaid CSG femto subscribed by SS 116 exist. If no such femto base stations are located within coverage area 125, BS 103 can ask SS 116 not to scan for any CSG. If the white list 363, stored in SS 116, includes a macro ID overlaying the SS subscribed CSG femto, then SS 116 can decide on its own whether to scan for CSG femto base stations based on the macro ID. If the ID of BS 103 is not within the white list 363 as the overlaying macro ID of the SS subscribed CSG femto, then SS 116 may not scan for any CSG within the coverage area 125 of BS 103.

The above-described embodiments related to subscriber station scanning by sending messages related to a request and receiving messages related to the list of nearby femtocells may be combined with the embodiments related to the techniques by which the macrocell or the serving cell selects a set of femtocells to monitor the specified uplink signaling, such as the specific ranging signal. For example, the subscriber station can request to wake up a desired CSG femto base station to which the subscriber station is subscribed by sending its desired CSGID to the serving base station. The subscriber station can request that the desired CSG be awakened by sending its desired CSGID to the serving base station when the subscriber station determines a location of the subscriber station and a location of the desired CSG femto base station and further determines that the subscriber station is proximate to the desired CSG femto base station.

In some embodiments, the subscriber station can send the uplink signaling to the femto base station when the processor in the subscriber station determines a location of the subscriber station and a location of a desired CSG femto base station and further determines the subscriber station is proximate to the desired CSG femto base station, so that the femto base station can at least one of be awaken and be aware of the subscriber station in proximity.

In some embodiments, one or more of the signals described above can be used to wake up FBS 160 if FBS 160 is in a low duty mode, or other reduced TX mode, such as idle mode, and the like. In some embodiments, one or more of the signals described above can be used to wake up multiple femto base stations, such as FBS 160-170, if FBS 160-170 are in a low duty mode, or other reduced TX mode, such as idle mode, and the like. FBS 160 can be awakened when FBS 160 detects the specific ranging signal and the signal strength satisfies some trigger conditions, such as the received signal strength (e.g., RSSI, SINR, and so forth) is greater than a threshold.

In some embodiments, if the number of femtos whose detected Cell ID and associated FA are in the white list 363 is very small (e.g., smaller than a threshold A) then SS 116 can decode SFH. In addition, SS 116 may not report the scanned Cell ID for ranging based screening. The threshold A can be used as a flexible tradeoff of unnecessary scanning/decoding SFH for unsubscribed CSG femto, and the additional reporting and ranging to screen the unnecessary scanning/decoding, when SS 116 reporting and ranging will also consume MS battery. The reported Cell ID and associated FA can be a compressed version that only sends the difference of the current detected information and the previous information.

In some embodiments, if the number of femtos whose detected Cell ID and associated FA are in the white list 363 satisfies some condition, such as being larger than a threshold B, or in-between a first level "A" and a second level "B", or the like, SS 116 can scan SFH of some of the femto base stations, such as for one or two BSIDs. SS 116 can report detected cell ID(s) and BSID(s) to BS 103 to request cell ID for accessible femto BS. For example, SS 116 can include an indicator for the request for cell ID for accessible femto BS can be indicated in the report message. BS 103 responds with cell ID of accessible femto BS. Then SS 116 can further scan SFH of these femto BSs with the indicated cell ID. The scan response may return an empty set of cell ID of accessible femto BS. If empty, SS 116 can choose not to scan.

In some embodiments, SS 116 updates the Cell ID in the white list 363 when the femto cell ID for FBS 160 is changed. FBS 160, the network, or both, can send a message to all FBS 160's subscribers regarding the update. In some embodiments, when SS 116 is in an idle state, SS 116 still can receive the Cell ID update and update the white list 363. For example, SS 116 can receive the update from the network 100 sending a message to each of the subscribers of FBS 160 about the update. The message sent by the network 100 about the Cell ID change of FBS 160 can be, for example, included in a Paging message. Each of the subscriber stations will be paged to update the cell ID in its list. The paging message can contain a field for cell ID update.

In some embodiments, the signal from BS 103 to SS 116 to ask SS 116 to send specific ranging, such as a common ranging of the possible femto BSs that can snoop, can be a message such as a message of ranging command, or other messages. The signal can include the information regarding the timing for ranging, such as a starting time, ending time (if available), number of the times for transmission, timing gap in-between two transmissions, and the like. The signal can include the information on which ranging resource, such as channel, code, or the like, will be assigned or used.

In some embodiments, SS 116 can perform ranging multiple times with some timing gap, or have a ranging indication first, then perform ranging after a certain time. After the first ranging, or the ranging indication, BS 103, or any BS that receives such ranging or ranging indication, can inform FBS 160-170 about the timing and ranging opportunities so that FBS 160-170 can listen to the next ranging.

If SS 116 sends detected cell ID, BS 103 can: 1) respond with accessible BS; or 2) takes ranging approach, then determine a more optimized list of accessible BS. In some embodiments, SS 116 reports whichever cell ID was detected: 1) the detected cell ID filtered by white list 363; or 2) cell ID not detected but directly from white list 363. SS 116 can include indications for all these scenarios such that BS 103 can operate accordingly.

In some embodiments, BS 103 can use location information for SS 116. The location information can be obtained from SS 116 such as when SS 116 includes a GPS unit. The location information can also be determined by BS 103 using other known location determining methods.

Figure 9:
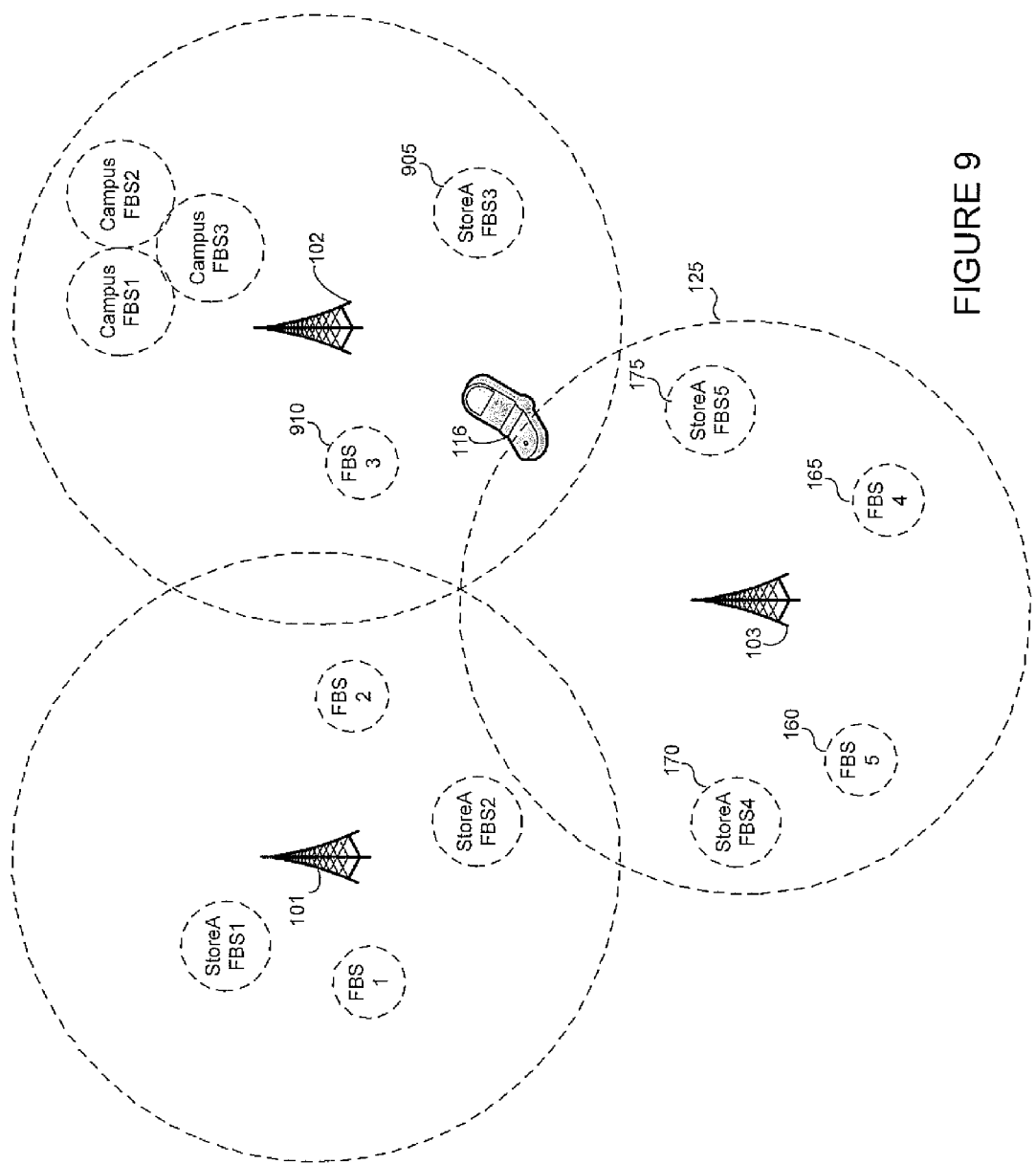
FIG. 9 illustrates a network wherein a femto base station can be awakened according to embodiments of the present disclosure.

FIG. 9 illustrates a network wherein a femto base station can be awakened according to embodiments of the present disclosure. The embodiment of the network shown in FIG. 9 is for illustration only. Other embodiments could be used without departing from the scope of this disclosure.

In the example shown in FIG. 9, a plurality of femto-base stations are located within the coverage area of base stations 101-103. The coverage areas of macro-base stations 101-103 are indicated by large dotted-line circles. The femtocells associated with the femto-base stations are indicated by small dotted lines circles. For convenience, the femto-base stations within the femtocells are not shown. MS 116 is assumed to be moving and may be in communication with any one of macro-base stations 101-103. At some point, MS 116 may attempt to handoff to one of the neighboring femto-base stations which has the CSGID values in the white list 363 stored in MS 116.

Four exemplary femto-base stations (FBSs) are depicted within the coverage area of macro-BS 101: Store A FBS1, Store A FBS2, FBS1 and FBS2. Store A FBS1 and Store A FBS2 are femto-base stations operated by a large chain store (e.g., Starbucks) that share a common CSGID. FBS1 and FBS2 may be individual femto-base stations operating in homes or offices.

Five femto-base stations (FBSs) are depicted in the coverage area of macro-BS 102: Store A FBS3 905, FBS3 910, Campus FBS1, Campus FBS2, and Campus FBS3. Store A FBS3 905 is another femto-base stations operated by the large chain store. Store A FBS3 905 shares a common CSGID with Store A FBS1 and Store A FBS2. FBS3 910 may be an individual femto-base station operating in an office of the operator of SS 116. Campus FBS1, Campus FBS2 and Campus FBS3 are femto-base stations that are operated by a single entity and are deployed near each other in a relatively large facility. Campus FBS1, Campus FBS2 and Campus FBS3 share a common CSGID. By way of example, Campus FBS1, Campus FBS2 and Campus FBS3 may be deployed throughout a large manufacturing plant or across multiple floors of a large office building. Alternatively, Campus FBS1, Campus FBS2 and Campus FBS3 may be deployed across the grounds of a large university campus.

Four exemplary femto-base stations (FBSs) are depicted within the coverage area of macro-BS 103: Store A FBS4 (which is FBS 170) and Store A FBS5 (which is FBS 175), FBS4 (which is FBS 165) and FBS5 (which is FBS 160). As before, Store A FBS14 170 and Store A FBS5 175 are femto-base stations operated by the large chain store. Store A FBS4 and Store A FBS5 share a common CSGID with Store A FBS1, Store A FBS2 and Store A FBS2. FBS4 165 and FBS5 160 may be individual femto-base stations operating in homes or offices. FBS5 160 may be operating in the home of the operator of SS 116.

Embodiments of the present disclosure provide systems and methods for common ranging and waking up idle femto base stations that may have full TX off, or part of the TX off, such as by manually sending a signal to wake-up one or more femto base stations, or for a location based waking-up. For example, in a location based waking up, SS 116 location and BS 103 can work in conjunction to activate FBS5 160 when FBS5 160 is in an idle or low duty mode. In the idle mode, for example, FBS5 160 can have its transmitter off and receiver on such that the receiver can listen, that is "snoop", for signals.

In some embodiments, FBS5 160 snoops its member SS (SS 116), so that FBS5 160 could be woken up. FBS5 160 also snoops SS 116 to enable SS 116 to handover. FBS5 160 snoops its non-member SS such that the non-member SS can have interference mitigation with the coordination of the serving BS (BS 103) and the interfering CSG femto (FBS5 160).

SS 116 can communicates with BS 103. Then BS 103 can tell FBS5 160, such as via backhaul 180, the information for the ranging from SS 116, such as the timing, resource block, and so forth. The Macro BS can only tell those CSG-closed femto which is subscribed by the MS. Then the femto now can snoop to the particular place, and get the MS information. If femto snoops something, then femto may exit the TX sleep or TX off mode if it is in that mode; or femto can tell macro e.g. via backhaul, to handover the MS to femto.

The femto base stations can snoop non-member subscriber stations. If SS 116 detects an interfering femto, such as Store A FBS3 905, then SS 116, as the non-member subscriber station, can perform ranging to Store A FBS3 905 via some special indication in the ranging signal to indicate such ranging. If SS 116's location is known or approximately known, then BS 102 can ask, e.g., via backhaul 131, the femtos (Store A FBS3 905 and FBS3 910) proximate to SS 116 to snoop on a certain resource, such as some resource for the ranging. The ranging can be for example, to BS 102, or some common ranging to femtos, and so forth.

In some embodiments, the ranging resource is preserved or preset. Then SS 116 can periodically send a signal over the preset resource so that Store A FBS3 905 and FBS3 910 can periodically snoop. In addition, some triggers can be used to trigger the ranging. For example, when SS 116 is proximate to Store A FBS3 905 and FBS3 910, then SS 116 can start the ranging process. SS 116 can start the ranging process autonomously, or be instructed by BS 102. The ranging can be to BS 102 (the serving BS), or to Store A FBS3 905 and FBS3 910 (the femtos that will snoop). SS 116 can ranges to the preserved resource of BS 103 or other BSs that may snoop less frequently than BSs snoop.

In some embodiments, a CSG-closed femto operates at the same FA as overlay macro. For example, Store A FBS3 905, which is a CSG-closed femto, can operate at the same FA as BS 102. Store A FBS3 905 then can act as a serving base station, that is, Store A FBS3 905 can operate as a CSG-open femto, which may allow some passing-by non-member subscriber stations to have best effort access. Alternatively, Store A FBS3 905 can still operate as the CSG-closed, but Store A FBS3 905 opens up some opportunity for non-member MS to signal an interference mitigation (IM) request. For example, SS 116, which is the non-member MS, can signal Store A FBS3 905 upon some conditions, on a reserved ranging resource, or using an indicator in the ranging request, to indicate to Store A FBS3 905 that it ranges for requesting interference mitigation (IM). Store A FBS3 905 (the CSG-closed femto) and network 100 can then authenticate and check the membership.

If Store A FBS3 905 and network accept the IM request, Store A FBS3 905 may negotiate with the network to perform IM, such as by Store A FBS3 905 reducing its power to some certain level, such that BS 102 can guarantees the subscriber stations' service. The transmitting power of BS 102 could be in-between the minimum required power to make all the members have a minimum required QoS, and the maximum allowable TX power. When there is IM request from the non-member SS, Store A FBS3 905 (the interfering BS) could reduce its power to the minimum required power; if the interference condition is removed, such as when the non-member SS is moving away from Store A FBS3 905, e.g., the received signal strength is less than a threshold for a period of time, then Store A FBS3 905 can increase the TX power, probably to the power level to make its served members have medium QoS, or excellent QoS, and so forth, up to the maximum allowable power. The TX power control of Store A FBS3 905 could be done iteratively at several levels, when power reduction is requested because of interference, Store A FBS3 905 could reduce its TX power from the current level to a lower level, when interference conditions are removed, then Store A FBS3 905 could increase its TX power from the current level to a higher level, until it reaches the maximum allowable power. When there are multiple such interference requests, or interference conditions removal signals, Store A FBS3 905 can try to satisfy all these requests or to accommodate interference conditions changes.

In some embodiments, if a femtocell (such as Store A FBS3 905 (CSG-closed femto)) is not serving, then the femtocell can proceed to a TX not-serving (or TX reduced) mode. The TX reduced mode can have multiple interpretations, such as TX idle or TX off mode, which that means a base station will completely shut down its air-interface transmitting. Alternatively, the TX reduced mode can be a low duty mode, which means it will transmit within a limited resource, such as limited time, or limited frequency. Alternatively, the TX reduced mode can be a TX quasi-idle state, which means the BS may not transmit anything other than some level of sync channel, such as primary preambles. If some member SS comes back to Store A FBS3 905 coverage, Store A FBS3 905 will be woken up and exit TX not-serving mode, and it may get into another TX not-serving mode with some TX transmitting (e.g., exiting TX off mode and entering a low duty mode), or it may get into a regular mode. Timers and event-based-triggers may be used for the mode transition. For example, if an active member SS that has an ongoing session with the network comes back to the CSG femto, the femto may get into a regular mode; if an idle member SS that does not have any ongoing sessions with the network comes back to the CSG femto, the femto may get into a low duty mode from the TX off mode, instead of getting into the regular mode. In another example, if all its member SSs have left the CSG femto or are in idle state, for a certain time given by a timer T1, the CSG femto may get into low duty mode from the regular mode; if all its member SSs have left the CSG femto, for a certain time given by a timer T2, the CSG femto may get into the TX off mode.

Store A FBS3 905 is used as the femto base station for example and ease of illustration. The examples described herein can be applied to other femto base stations without departing from the scope of this disclosure. Herein below, for example, FBS5 160 is used for illustration purposes. However, the descriptions are not limited to a FBS5 160 or a femto located within a home and other base stations could be used without departing from the scope of this disclosure.

When FBS5 160 is in TX not-serving mode, FBS5 160 can receive/listen. However, FBS5 160 may not need to listen all the time in the air interface. FBS5 160 can wake up in the following ways:

BS 103 can wake up FBS5 160 via the backhaul 180. For example, BS 103 may know the location of SS 116 when SS 116 is within the coverage area 125 of BS 103 through location information, or a report from SS 116 on nearby femtos. Therefore, BS 103 knows that SS 116 is proximate to FBS5 160. Then BS 103 can wake FBS5 160.

BS 103 can signal SS 116 to send a special signal, such as a common ranging signal to wake up FBS5 160. The a common ranging signal can be a sounding-like, ranging-like, or other like signals. The common ranging signal may be able to be sent to FBS5 160 without SS 116 detecting FBS5 160's sync and SFH. The common ranging signal can contain the information of SS 116, such as Cipher-based Message Authentication Code (CMAC), so that, upon receiving it, FBS5 160 may forward it and ask the upper layer to tell whether SS 116 is its member, and whether FBS5 160 should wake up.

If no CMAC is available, then further initial network entry like procedure will be evoked temporarily so that SS 116 can send its identification security to get authorization. In some embodiments, only member subscriber stations can wake up FBS5 160.

SS 116 sends (e.g., broadcast) a special signal (the common ranging signal) according to one or more triggers so that FBS5 160 can wake up if FBS5 160 determines (e.g., via upper layer) that SS 116 is its member. The triggers can include: if SS 116 has very low signal strength from BS 103; SS 116 is informed by the BS 103 or the network that SS 116 is proximate to an accessible femto, in which BS 103 or the network can also send SS 116 the identification of the possibly accessible femtos, such as FA, Cell ID, BSID, and so forth.

The special signal can be sent according to a pre-defined timing (e.g., particular frame/subframe). This can reduce the listening time for FBS5 160.

In some embodiments, the common ranging signal comprises a predefined or reserved ranging channel, which may be common for all the CSG-closed femto with the same FA as BS 103. The femtos with the same FA as BS 103 reserve such channel.

The timing for common ranging signal can be predefined, or otherwise reserved, to a set of timings for SS 116 to transmit a common ranging signal. Each subscriber station may use a subset of the timings. For example, the MS's ID can be hashed into different subsets to reduce the collision.

In some embodiments, when FBS5 160 is in a TX not-serving (or TX reduced) mode, FBS5 160 monitors the timings for common ranging signal. FBS5 160 will monitor (snoop) the common ranging channel autonomously, or when instructed by BS 103 or the network.

BS 103, the network, or both, can refine the set of femtos that need to monitor the special ranging signal, or the common ranging signal. These femtos ideally should be the femto base stations that are in close proximity to SS 116 and to which SS 116 is a member. The refinement can be performed based on one or more of: MS ID information; subscriber stations location information, such as the location by GPS, and so forth; the subscriber stations reported detected BSs with cell IDs, CSGIDs, or BSIDs, and the like; a reported received signal strength; the a local white list 363 check result showing which BSs are in the white list 363 and which are not; information that the serving base station and/or the network have about the subscription/membership of the subscriber station to FBS5 160; the white list 363 content; and the like. Based on the information, either or both of BS 103 and the network can figure out CSG femtos which have a member subscriber station coming close by.

If the set of refined possible accessible femto BS is empty, then SS 116 will not send any common ranging or special ranging. In addition, the femtos will not snoop for ranging signals from SS 116. If the set is non-empty, SS 116 can send common ranging or special ranging and the femtos can snoop for the common ranging or special ranging.

In some embodiments, if the number of refined possible accessible femto BS is larger than a threshold, then BS 103, the network, or both, may ask the relevant femtos to snoop/monitor for a common ranging, or special ranging, sent by SS 116. Otherwise, BS 103, the network, or both, can send a list of the possible accessible femto BS and ask SS 116 to scan and report. For example, SS 116 can send a message such as scan response that includes the results of the scan. SS 116 may scan the sync channel, BCH (SFH), and measure the pilots, and so forth. The threshold of the number of refined possible accessible femto BS can be used to optimize the energy spent by SS 116 detecting the accessible femtos.

In some embodiments, SS 116 can detect inaccessible femto base stations. In some embodiments, the special ranging signal (such as the common ranging signal), contains information regarding SS 116, such as CMAC. Upon receiving the information, FBS5 160 can forward it and ask the upper layer to tell whether SS 116 is its member, and whether FBS5 160 should wake up.

If no CMAC is available, then further initial network entry like procedure will be temporarily evoked such that SS 116 can send its identification securely to obtain authorization since FBS5 160 need wake up only for a member subscriber station. The signal can also serve as an UL sounding-like signal for UL snooping. In addition, transmitting power can be indicated in the signal, indicated via the backhaul 180 to the BSs that snoop, or predefined so that BSs that snoop can know it.

In some embodiments, when SS 116 is in an idle mode and enters the coverage of FBS5 160 in TX idle mode, SS 116 does not perform a location update since SS 116 does not realize the existence of FBS5 160. It can be that nothing should be done for such case, and, as such no location update and no femto waking up. Alternatively, if SS 116 cannot reach any BS, SS 116 can broadcast the special signal (common ranging signal). If SS 116 can still reach some BS in its available interval, SS 116 can report some measurement, such as BS 102 signal strength, nearby BSs, location information, and so forth, so that BS 102 can decide whether to trigger a wake-up of FBS5 160, either via the backhaul 180 or via subscriber station signaling.

SS 116 also can self-decide whether to send the special signal. For example, SS 116 can send the special signal if SS 116 has cached location information of FBS5 160, and SS 116 finds that its current location is near FBS5 160.

When FBS5 160 is woken up, FBS5 160 will exit from the TX reduced state. Alternatively, FBS5 160 may transition from TX idle state into low duty mode (LDM) state if LDM supported or FBS5 160 may transition into normal state, and so forth.

In some embodiments, when a number of subscriber stations, which are near or inside FBS3 910, are transmitting on the uplink to BS 102, the subscriber stations create a lot of interference to FBS3 910. Since FBS3 910 is closed, these subscriber stations cannot hand over to it. Therefore, interference mitigation can be performed as follows:

SS 116 reads the preamble and SFH of the macro; SS 116 then transmits on the ranging channel to BS 102 (it has to, before it can make any uplink transmissions to the macro). BS 102 alerts FBS3 910 that SS 116 is trying to range to BS 102, and that FBS3 910 should try to listen to this ranging transmission.

If FBS3 910 thinks the ranging transmission from SS 116 is "too loud" (e.g., signal strength higher than a threshold, or signal strength higher than a threshold related to the transmitting power of SS 116, where SS 116 tx power could be signaled to FBS3 910 via the message, or via the backhaul 131 from BS 102 or the network, or a predefined subscriber station tx power, and so forth), then FBS3 910 can tell BS 102 to add SS 116 to the pool of subscriber stations that need to be interference-managed; both FBS3 910 and BS 102 will be referring to the same subscriber station. Therefore, BS 102 and FBS3 910 can identify the problem subscriber stations and take appropriate follow-up action for interference mitigation.

In some embodiments, an operator of SS 116 can manually send a signal to FBS5 160 to request that FBS5 160 wake-up or go to sleep, such as by entering a TX reduced mode. Alternatively, the entrance of SS 116 into the building/room containing FBS5 160 could operate as the trigger to wake-up FBS5 160. Additionally, SS 116 leaving the building/room containing FBS5 160 can be a trigger for FBS5 160 to hibernate.

Enterprise and home use cases for femto can be differently treated. For example, in the enterprise case, the femtos in the neighborhood within the same CSG can be broadcasted in the neighborlist, and they can be arranged or indicated together under the same CSG ID; however, in the home use case, such as an apartment use case, then the CSG femtos belong to different apartment home uses are not included in the neighbor list broadcasted.

In some embodiments, the white list 363 contains the identifiers of allowable femto ABSs, such as BSID, Cell_ID and associated FA, CSGID, femto associated overlay macro identifiers (FA, cell ID, BSID). When SS 116 is with BS 103, BS 103 BS knows the MS ID of SS 116. BS 103, the network, or both check whether in this macro coverage there is any underlaid CSG femto to which SS 116 is a subscriber. If there is no such femto, BS 103 may ask SS 116 not to scan for any CSG. If the white list 363 includes a macro ID overlaying a SS 116 subscribed CSG femto, then SS 116 can decide on its own whether to scan for CSG based on the macro ID. If the ID of BS 103 is not within the white list 363 as the overlaying macro ID of the SS 116 subscribed CSG femto, then SS 116 may not scan for any CSG within the coverage of BS 103.

Alternatively, BS 103 can recommend that FBS5 160 monitor UL signaling of accessible subscriber stations that are served by BS 103. If FBS5 160 is in low-duty mode, FBS5 160 can try to receive A-MAP (advanced MAP, the mapping information of resource block assigned) information from BS 103 and then monitor accessible subscriber station UL signaling in associated allocations.

No matter whether FBS5 160 is in low duty mode or not, SS 116 reports to BS 103 the detected Cell ID and associated FA, and SS 116 may choose not to report if detected Cell ID and FA are not in its white list 363.

BS 103, the network, or both determines, under coverage of BS 103, the set of those FBS to which SS 116 is subscribed and that have the reported Cell ID and associated FA. BS 103 asks that those FBS monitor a specific ranging opportunity. BS 103, the network, or both, can refine the set of the possibly accessible femto BS in proximity to SS 116 based on location information of SS 116, reported detected Cell ID, FA, CSGID, BSID, and the like. If such set is empty, BS 103 may not to initiate the specific ranging process.

BS 103 can coordinate with FBS5 160, to which SS 116 is subscribed, and which has the reported Cell ID and associated FA, to determine the specific ranging opportunity. Alternatively, BS 103 may coordinate with the network to determine the specific ranging opportunity. The ranging is a common ranging for the femto ABSs.

After the ranging opportunities are determined, BS 103 asks SS 116 to send the ranging signal at the specific ranging opportunity. In response, SS 116 sends ranging signal at the specific ranging opportunity. Given one report on detected Cell IDs sent by SS 116, SS 116 can perform limited occurrences of the specific ranging, e.g., one time, or one shot with repeated M times, or periodically N times, until a new report is sent, or a new set of Cell ID is detected, or a new set of possibly accessible femto BS in proximity to SS 116 is configured, or within a given certain time.

The FBSs that are asked to monitor the specific ranging opportunity, monitor the specific ranging. If FBS5 160 detects the signal, FBS5 160 informs BS 103. When a set of trigger conditions are met, e.g., the received signaling quality (e.g RSSI, SINR, etc.) of SS 116 is stronger than a threshold, FBS5 160 can request BS 103 to send signal/message for SS 116 to scan FBS5 160.

SS 116 can scan further for SFH of FBS5 160, which is the femto appointed BS 103, for cell selection or cell reselection. FBS5 160 is a subscribed femto for SS 116.

If there is no femto informing that it receives the specific ranging, then BS 103 may not ask SS 116 to further scan for femto SFH. In some embodiments, only if there is femto informing that it receives the specific ranging does BS 103 asks SS 116 to scan the femto that detected the specific ranging.

The specific ranging opportunity can be the ranging opportunity of the BS involved, such as BS 103 or FBS5 160. If multiple femtos are involved, the ranging can be a common ranging for all these femtos, or different ranging opportunities for different femtos while the femtos know the rule of how the ranging opportunities are mapped to the femto BSs.

The specific ranging opportunity can be signaled by BS 103 to SS 116, or predefined or figured as a function of the system information such as MS ID, Cell ID, BS ID, and the like. Therefore, SS 116 determine the ranging opportunity. If the ranging opportunity is common for many BSs, the ranging opportunity can be some predefined or reserved ranging opportunity, or some common ranging opportunities dynamically assigned, or a function of some system information common to these BSs, such as the overlay macro BS ID, cell ID, and so forth.

The specific ranging opportunity can include the ranging channel defined in time and frequency. Specific ranging code can be used. The ranging code can be different for different MSs, or it can be the same (e.g., it can be reserved.)

The specific ranging code can be the outcome of a mapping of subscriber station identification, which can be understood as subscriber station dedicated ranging. The same mapping can be known by the BSs to which the ranging channel belongs such that the BSs can determine which subscriber station is ranging from the ranging code.

SS 116 can send ranging signal (code) on ranging opportunity using a certain TX power. The TX power can be signaled to the base stations that are monitoring the ranging, or the TX power can be predefined so that SS 116 and the BSs all know the predefined value, or the TX power can be a function/mapping of some system information and such function/mapping can be predefined and known by SS 116 and the BSs, such that they can determine the value of TX power. By knowing the Tx power, FBS5 160 can estimate whether SS 116 is close by. The trigger conditions, such as the value of RSSI threshold at BS who monitors the specific ranging, can be configurable by the TX power level.

In some embodiments, when the femtocell is in the transmission reduced mode, such as in low-duty mode, the femtocell can indicate whether it is in such a mode by conveying the indication over the air, so that the subscriber station can detect the indication and know the status of the femtocell. For example, the cell IDs on the sync channel may be partitioned, so that one set of the cell IDs can indicate the femtocells are in low-duty mode, and another set of the cell IDs can indicate the femtocells are not in low-duty mode. The configuration of how the cell IDs are partitioned for the indication of in or not in the low-duty mode can be predefined or preprovisioned to the subscriber station, or be sent to the subscriber station by, for example, broadcasting, unicasting, multicasting, and the like.

When the subscriber station detects the cell ID of the femtocell, the subscriber station can determine which set the cell ID is in and determine whether the femtocell is in the low duty mode or not. Similarly, the indication of whether the femtocell is in the low duty mode or not can be carried in the broadcast channel. The broadcast channel can also carry the information of the low duty mode pattern the femtocell is using, such as the starting time of the available interval and its length, and the length of the unavailable interval length, etc. If multiple patterns are used for all the femtocells, these multiple patterns can be coded or indexed, so that the broadcast channel of the femtocell may carry the index of the pattern that the femtocell uses. The subscriber station can detect the broadcast channel, and detect the low-duty mode related information, such as whether the femto is in the low-duty mode, and what pattern of the low-duty mode is, and report such information to the serving cell, such as a macro cell, so that the macrocell can be aware of the status of the femtocell.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communications network, a subscriber station configured to communicate with a plurality of macro base stations, the subscriber station comprising:
a processor; and
a memory coupled to the processor, the memory comprising a white list, the white list comprising information regarding a number of closed subscriber group base stations to which the subscriber station is subscribed, wherein the processor is configured to:
scan, via a transceiver, femto base stations based on a message received from a serving base station, the message configured to identify a subset of femto base stations, the message received in response to a request message sent by the subscriber station; and
send, via the transceiver, an uplink signaling to the femto base stations, the uplink signaling sent at a specified resource.

2. The subscriber station as set forth in claim 1, wherein the subset of femto base stations comprises information regarding at least one of:
a number of femto base stations accessible to the subscriber station;
a number of femto base stations inaccessible to the subscriber station;
indication of accessible femto base stations; and
indication of inaccessible femto base stations.

3. The subscriber station as set forth in claim 1, wherein the request message comprises at least one of:
a first indicator configured to indicate one of:
a request for neighboring base stations; and
a request to check accessibly of base stations;
a second indicator configured to indicate one of:
an identifier (ID) detected but not supported by the white list, wherein the ID can be at least one of: a closed subscriber group identifier (CSGID), a physical layer cell identifier (cell ID), and a unique base station identifier (BSID);
ID detected but not in the white list;
ID detected and in the white list; and
ID not detected but in the white list; and
location information for the subscriber station.

4. The subscriber station as set forth in claim 1, wherein the uplink signaling is configured to wake up at least one base station such that the at least one base station one of:
transitions from a transmission off mode to a transmission reduced mode;
transitions from a transmission off mode to a low duty cycle mode;
transitions from a transmission off mode to a regular mode;
transitions from a low duty cycle mode to a regular mode; and
activates a transmitter such that the subscriber station is able to scan the base station.

5. The subscriber station as set forth in claim 1, wherein the specified resource at which the uplink signaling is sent can be of at least one of the configurations:
1) a predefined resource configuration, which is known by the subscriber station and the femto base station;
2) a resource configuration which is common to all subscriber stations;
3) resource configuration which is common to femto base stations;
4) resource configuration which can be different for femto base stations;
5) recourse configuration which can be different for subscriber base stations;
6) resource configuration which can be configured and sent by the serving base station to at least one of the subscriber station and the femto base station;
7) resource configuration which can be configured and sent by the network to at least one of the subscriber station and the femto base station; and
8) resource configuration in which some of the parameters can be a result of a mapping from system information.

6. The subscriber station as set forth in claim 1, wherein the processor is configured to at least one of:
  request to wake up a desired CSG fetmo base station to which the subscriber station is subscribed, by sending its desired CSGID to the serving base station; and
  send the uplink signaling to the femto base station when the processor knows a location of the subscriber station and a location of a desired CSG femto base station and when the processor knows the subscriber station is proximate to the desired CSG femto base station, so that the femto base station can at least one of be awaken and be aware of the subscriber station in proximity.

7. For use in a wireless communications network, a macro base station configured to communicate with a plurality of subscriber stations, the macro base station comprising:
  a receive path configured to receive, from a first subscriber station, a first control message that contains at least one CSGID value from a white list of CSGID values associated with at least one closed subscription group to which the first subscriber station is subscribed; and
  a controller at least one of:
    coupled to a transmit path, the controller configured to, in response to the first control message, transmit, to the first subscriber station, a second control message that contains information regarding a subset of femto base stations, the second control message configured to cause the first subscriber station to scan femto base stations based on the subset of femto base stations; and
    coupled to a backhaul network, the controller configured to, select a set of accessible CSG femto base stations that are proximate to the first subscriber station, to receive instructions on at least one of waking up and monitoring an uplink signaling.

8. The macro base station as set forth in claim 7, wherein the subset of femto base stations comprises information regarding at least one of:
  a number of femto base stations accessible to the subscriber station;
  a number of femto base stations inaccessible to the subscriber station;
  indication of accessible femto base stations; and
  indication of inaccessible femto base stations.

9. The macro base station as set forth in claim 7, wherein the first control message comprises a request message sent by the first subscriber station, and wherein the request message comprises at least one of:
  a first indicator configured to indicate one of:
    a request for neighboring base stations; and
    a request to check accessibly of base stations;
  a second indicator configured to indicate one of:
    an identifier (ID) detected but not supported by white list, wherein the ID can be at least one of: a closed subscriber group identifier (CSGID), a physical layer cell identifier (cell ID), and a unique base station identifier (BSID);
    ID detected but not in the white list;
    ID detected and in the white list; and
    ID not detected but in the white list; and
  location information for the subscriber station.

10. The macro base station as set forth in claim 7, wherein controller is configured to wake up at least one femto base station based on a location of the first subscriber station proximate to the at least one femto base station, where the at least one base station one of:
  transitions from a transmission off mode to a transmission reduced mode;
  transitions from a transmission off mode to a low duty cycle mode;
  transitions from a transmission off mode to a regular mode;
  transitions from a low duty cycle mode to a regular mode; and
  activates a transmitter such that the subscriber station is able to scan the base station.

11. The macro base station as set forth in claim 7, wherein controller is configured to, prior to the controller recommending that a CSG femto base station monitor uplink signaling, select a set of accessible CSG femto base station that are proximate to the first subscriber station based on at least one of:
  location information of the first subscriber station;
  base station information reported by the first subscriber station;
  location of the base station; and
  location of the femto base station.

12. The macro base station as set forth in claim 11, wherein controller is configured to, if the set of the accessible CSG femto base station selected by the controller is empty, not recommend any CSG femto base station to monitor uplink signaling.

13. The macro base station as set forth in claim 7, wherein the controller is configured to at least one of:
  send instructions via a backhaul network to the femto base station to wake up the femto base station such that a transmission path of the femto base station is enabled hence the subscriber station can scan;
  send instructions via a backhaul network to the femto base station regarding a configuration of an uplink signaling, wherein the configuration includes the resource and timing allocated for a specific ranging signal, and regarding the femto base station monitoring, via the receive path, the specific ranging signal sent by the first subscriber station, and if the signal is detected, cause the femto base station to exit from the first mode such that the transmission path is enabled hence the subscriber station can scan; and
  send instructions to the first subscriber station regarding a configuration of an uplink signaling, wherein the configuration includes the resource and timing allocated for a specific ranging signal, and regarding to instruct the first subscriber station to send a specific uplink signal in the resource allocation and at the timing.

14. A method for operating a subscriber station configured to communicate with a plurality of macro base stations, the method comprising:
  storing a white list in a memory of the subscriber station, the white list comprising information regarding a number of closed subscriber group base stations to which the subscriber station is subscribed;
  receiving a message from a serving base station, the message configured to identify a subset of base stations; and
  at least one of:
    scanning femto base stations based on a message received from a serving base station, the message configured to identify a subset of femto base stations; and
    sending an uplink signaling to the femto base stations, the uplink signaling sent at a specified resource.

15. The method as set forth in claim 14, wherein the subset of femto base stations comprises information regarding at least one of:
  a number of femto base stations accessible to the subscriber station;

a number of femto base stations inaccessible to the subscriber station;
indication of accessible femto base stations; and
indication of inaccessible femto base stations.

16. The method as set forth in claim 14, further comprising:
transmitting a request message to the serving base station, wherein the message is received in response to the request message sent by the subscriber station, wherein transmitting the request message comprises at least one of:
a first indicator configured to indicate one of:
a request for neighboring base stations; and
a request to check accessibly of base stations;
a second indicator configured to indicate one of:
an identifier (ID) detected but not supported by the white list, wherein the ID can be at least one of: a closed subscriber group identifier (CSGID), a physical layer cell identifier (cell ID), and a unique base station identifier (BSID);
ID detected but not in the white list;
ID detected and in the white list; and
ID not detected but in the white list; and
location information for the subscriber station.

17. The method as set forth in claim 14, wherein the scanning is configured to wake up at least one base station such that the at least one base station one of:
transitions from a transmission off mode to a transmission reduced mode;
transitions from a transmission off mode to a low duty cycle mode;
transitions from a transmission off mode to a regular mode;
transitions from a low duty cycle mode to a regular mode; and
activates a transmitter such that the subscriber station is able to scan the base station.

18. The method as set forth in claim 14, wherein the specified resource at which the uplink signaling is sent can be of at least one of the configurations:
1) a predefined resource configuration, which is known by the subscriber station and the femto base station;
2) a resource configuration which is common to all subscriber stations;
3) resource configuration which is common to femto base stations;
4) resource configuration which can be different for femto base stations;
5) recourse configuration which can be different for subscriber base stations;
6) resource configuration which can be configured and sent by the serving base station to at least one of the subscriber station and the femto base station;
7) resource configuration which can be configured and sent by the network to at least one of the subscriber station and the femto base station; and
8) resource configuration in which some of the parameters can be a result of a mapping from system information.

19. The subscriber station as set forth in claim 14, further comprising at least one of:
requesting to wake up a desired CSG fetmo base station to which the subscriber station is subscribed, by sending its desired CSGID to the serving base station; and
sending the uplink signaling to the femto base station when the processor knows a location of the subscriber station and a location of a desired CSG femto base station and when the processor knows the subscriber station is proximate to the desired CSG femto base station, so that the femto base station can at least one of be awaken and be aware of the subscriber station in proximity.

20. For use in a wireless communications network, a method for operating a macro base station configured to communicate with a plurality of subscriber stations, the method comprising:
receiving from a first subscriber station a first control message that contains at least one CSGID value from a white list of CSGID values associated with at least one closed subscription group to which the first subscriber station is subscribed;
in response to the first control message, transmitting to the first subscriber station a second control message that contains information regarding a subset of femto base stations, the second control message configured to cause the first subscriber station to scan femto base stations based on the subset of femto base stations; and
selecting a set of accessible CSG femto base stations that are proximate to the first subscriber station, to receive instructions on at least one of waking up and monitoring an uplink signaling.

21. The method as set forth in claim 20, wherein the subset of femto base stations comprises information regarding at least one of:
a number of femto base stations accessible to the subscriber station;
a number of femto base stations inaccessible to the subscriber station;
indication of accessible femto base stations; and
indication of inaccessible femto base stations.

22. The method as set forth in claim 20, wherein the first control message comprises a request message sent by the first subscriber station wherein the request message comprises at least one of:
a first indicator configured to indicate one of:
a request for neighboring base stations; and
a request to check accessibly of base stations;
a second indicator configured to indicate one of:
an identifier (ID) detected but not supported by white list, wherein the ID can be at least one of: a closed subscriber group identifier (CSGID), a physical layer cell identifier (cell ID), and a unique base station identifier (BSID);
ID detected but not in the white list;
ID detected and in the white list; and
ID not detected but in the white list; and
location information for the subscriber station.

23. The method as set forth in claim 20, further comprising:
waking up at least one femto base station based on a location of the first subscriber station proximate to the at least one femto base station, where the at least one base station one of:
transitions from a transmission off mode to a transmission reduced mode;
transitions from a transmission off mode to a low duty cycle mode;
transitions from a transmission off mode to a regular mode;
transitions from a low duty cycle mode to a regular mode; and
activates a transmitter such that the subscriber station is able to scan the base station.

24. The method as set forth in claim 20, further comprising:
selecting a set of accessible CSG femto base station that are proximate to the first subscriber station based on at least one of:

location information of the first subscriber station;
base station information reported by the first subscriber station;
location of the base station; and
location of the femto base station.

25. The method as set forth in claim 24, further comprising:
if the set of the accessible CSG femto base stations is empty, not recommending any CSG femto base station to monitor uplink signaling.

26. The method as set forth in claim 20, further comprising at least one of:
sending instructions via a backhaul network to the femto base station to wake up the femto base station such that a transmission path of the femto base station is enabled hence the subscriber station can scan;
sending instructions via a backhaul network to the femto base station regarding a configuration of an uplink signaling, wherein the configuration includes the resource and timing allocated for a specific ranging signal, and regarding the femto base station monitoring, via the receive path, the specific ranging signal sent by the first subscriber station, and if the signal is detected, cause the femto base station to exit from the first mode such that the transmission path is enabled hence the subscriber station can scan; and
sending instructions to the first subscriber station regarding a configuration of an uplink signaling, wherein the configuration includes the resource and timing allocated for a specific ranging signal, and regarding to instruct the first subscriber station to send a specific uplink signal in the resource allocation and at the timing.

27. For use in a wireless communications network, a femto base station configured to communicate with a plurality of subscriber stations, the femto base station comprising:
a receive path configured to receive communications from a first subscriber station;
a transmit path configured to transmit communications to the first subscriber station; and
a controller coupled to the transmit path and the receive path, the controller configured to:
vary an operating mode of the femto base station based on proximity information for the first subscriber station, wherein, in a first mode the transmit path is disabled; and
monitor an uplink signaling from the first subscriber station at a specified resource.

28. The femto base station as set forth in claim 27, wherein the controller is configured to cause the femto base station to operate in the first mode in response to at least one of:
no member subscriber stations are served by the femto base station;
no member subscriber stations are served by the femto base station for a certain time duration;
if all its member subscriber stations have locations not within a range of the femto base station; and
all its member subscriber stations have had a location update that shows that all its member subscriber stations are not in the range of the femto base station.

29. The femto base station as set forth in claim 27, wherein the controller is configured to at least one of:
receive instructions from a backhaul network regarding a configuration of an uplink signaling, wherein the configuration includes the resource and timing allocated for a specific ranging signal;
receive instructions from a backhaul network to exit from the first mode; and if the instructions are received, cause the femto base station to exit from the first mode such that the transmission path is enabled hence the subscriber station can scan;
receive instructions from a backhaul network regarding a configuration of an uplink signaling, wherein the configuration includes the resource and timing allocated for a specific ranging signal, and monitor, via the receive path, the specific ranging signal sent by the first subscriber station, and if the signal is detected, cause the femto base station to exit from the first mode such that the transmission path is enabled hence the subscriber station can scan based on the resource allocation and timing indicated in the received instruction, the controller is configured to monitor, via the receive path, the specific uplink signal sent by the first subscriber station, and wherein, if the signal is detected, the controller is configured to cause the femto base station to wake up such that the transmit path is enabled such that the subscriber station can scan.

30. The femto base station as set forth in claim 27, wherein the specified resource at which the uplink signaling is monitored can be of at least one of configurations:
1) a predefined resource configuration, which is known by the subscriber station and the femto base station;
2) a resource configuration which is common to all subscriber stations;
3) resource configuration which is common to femto base stations;
4) resource configuration which can be different for femto base stations;
5) recourse configuration which can be different for subscriber base stations;
6) resource configuration which can be configured and sent by the serving base station to at least one of the subscriber station and the femto base station;
7) resource configuration which can be configured and sent by the network to at least one of the subscriber station and the femto base station; and
8) resource configuration in which some of the parameters can be a result of a mapping from system information.

31. For use in a wireless communications network, a method of operating a femto base station configured to communicate with a plurality of subscriber stations, the method comprising
receiving communications from a first subscriber station;
transmitting communications to the first subscriber station;
varying an operating mode of the femto base station based on proximity information for the first subscriber station, wherein, in a first mode the transmit path is disabled; and
monitoring an uplink signaling from the first subscriber station at a specified resource.

32. The method as set forth in claim 31, wherein varying comprising operating in the first mode in response to at least one of:
no member subscriber stations are served by the femto base station;
no member subscriber stations are served by the femto base station for a certain time duration;
if all its member subscriber stations have locations not within a range of the femto base station; and
all its member subscriber stations have had a location update that shows that all its member subscriber stations are not in the range of the femto base station.

33. The method station as set forth in claim 31, further comprising at least one of:

receiving instructions from a backhaul network regarding a configuration of an uplink signaling, wherein the configuration includes the resource and timing allocated for a specific ranging signal;

receiving instructions from a backhaul network to exit from the first mode; and if the instructions are received, cause the femto base station to exit from the first mode such that the transmission path is enabled hence the subscriber station can scan; and receiving instructions from a backhaul network regarding a configuration of an uplink signaling, wherein the configuration includes the resource and timing allocated for a specific ranging signal, and monitor, via the receive path, the specific ranging signal sent by the first subscriber station, and if the signal is detected, cause the femto base station to exit from the first mode such that the transmission path is enabled hence the subscriber station can scan based on the resource allocation and timing indicated in the received instruction, the controller is configured to monitor, via the receive path, the specific uplink signal sent by the first subscriber station, and wherein, if the signal is detected, the controller is configured to cause the femto base station to wake up such that the transmit path is enabled such that the subscriber station can scan.

34. The method as set forth in claim 31, wherein the specified resource at which the uplink signaling is monitored can be of at least one of configurations:

1) a predefined resource configuration, which is known by the subscriber station and the femto base station;
2) a resource configuration which is common to all subscriber stations;
3) resource configuration which is common to femto base stations;
4) resource configuration which can be different for femto base stations;
5) recourse configuration which can be different for subscriber base stations;
6) resource configuration which can be configured and sent by the serving base station to at least one of the subscriber station and the femto base station;
7) resource configuration which can be configured and sent by the network to at least one of the subscriber station and the femto base station; and
8) resource configuration in which some of the parameters can be a result of a mapping from system information.

\* \* \* \* \*